(12) United States Patent
Tanaka et al.

(10) Patent No.: US 11,747,557 B2
(45) Date of Patent: Sep. 5, 2023

(54) WAVELENGTH CHECKER

(71) Applicant: Nippon Telegraph and Telephone Corporation, Tokyo (JP)

(72) Inventors: Takuya Tanaka, Tokyo (JP); Hiroshi Ishikawa, Tokyo (JP); Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 46 days.

(21) Appl. No.: 17/633,532

(22) PCT Filed: Aug. 23, 2019

(86) PCT No.: PCT/JP2019/033063
§ 371 (c)(1),
(2) Date: Feb. 7, 2022

(87) PCT Pub. No.: WO2021/038630
PCT Pub. Date: Mar. 4, 2021

(65) Prior Publication Data
US 2022/0276435 A1    Sep. 1, 2022

(51) Int. Cl.
*G02B 6/12* (2006.01)
*G01M 11/00* (2006.01)
(Continued)

(52) U.S. Cl.
CPC .......... *G02B 6/12019* (2013.01); *G01J 1/58* (2013.01); *G01M 11/35* (2013.01);
(Continued)

(58) Field of Classification Search
CPC ........ G01J 1/58; G01M 11/35; G02B 6/12019
See application file for complete search history.

(56) References Cited

U.S. PATENT DOCUMENTS

| 2008/0175284 A1* | 7/2008 | Konttinen | H01S 5/141 |
| | | | 372/22 |
| 2009/0016716 A1* | 1/2009 | Ishida | G02B 6/2852 |
| | | | 385/14 |

(Continued)

FOREIGN PATENT DOCUMENTS

| JP | 2003-131071 A | * | 5/2003 |
| JP | 2003-218813 A | * | 7/2003 |

(Continued)

OTHER PUBLICATIONS

English translation of written opinion for PCT/JP2019/033063, dated Jan. 7, 2020. (Year: 2020).*

(Continued)

*Primary Examiner* — Michael Stahl
(74) *Attorney, Agent, or Firm* — Slater Matsil, LLP

(57) ABSTRACT

A wavelength checker includes an optical converter composed of a conversion material that converts infrared light into visible light. The optical converter is disposed, on an output side (side from which light is output to an external space) of a plurality of first output waveguides of an optical waveguide chip, to receive emitted light that is guided through the first output waveguides and reflected on and emitted from the light emitting-side end surface. The light emitting-side end surface is a reflection surface that is inclined to face a main substrate.

18 Claims, 39 Drawing Sheets

(51) Int. Cl.
*G01J 1/58* (2006.01)
*G01J 9/00* (2006.01)
*G02B 6/13* (2006.01)

(52) U.S. Cl.
CPC ............ *G02B 6/12016* (2013.01); *G01J 9/00* (2013.01); *G02B 6/13* (2013.01)

(56) References Cited

U.S. PATENT DOCUMENTS

| | | | | |
|---|---|---|---|---|
| 2012/0114293 | A1* | 5/2012 | Choe ................... | G02B 6/4214 385/129 |
| 2021/0356665 | A1* | 11/2021 | Tanaka ............... | G02B 6/12011 |
| 2021/0373233 | A1* | 12/2021 | Tanaka ................ | G02B 6/4204 |
| 2022/0381982 | A1* | 12/2022 | Tanaka ............... | G02B 6/12016 |
| 2022/0404565 | A1* | 12/2022 | Tanaka ................ | G02B 6/4214 |

FOREIGN PATENT DOCUMENTS

| | | | |
|---|---|---|---|
| JP | 2004-170488 A | * | 6/2004 |
| JP | 2008-96237 A | * | 4/2008 |
| JP | 2017-194565 A | * | 10/2017 |

OTHER PUBLICATIONS

English translation of written opinion for PCT/JP2019/040415, dated Dec. 24, 2019. (Year: 2019).*
Koma et al. "Standardization trends for faster PON systems" NTT Technology Journal, vol. 29, No. 8, 2017, pp. 51-53.

* cited by examiner

WAVELENGTH CHECKER

CROSS-REFERENCE TO RELATED APPLICATIONS

This application is a national phase entry of PCT Application No. PCT/JP2019/033063, filed on Aug. 23, 2019, which application is hereby incorporated herein by reference.

TECHNICAL FIELD

The present invention relates to a wavelength checker, and more specifically, to a wavelength checker that performs, for example, confirmation of signal light in opening and failure isolation investigation of a PON system.

BACKGROUND

In an access-type passive optical network (PON) system of an optical communication system, a plurality of light beams having relatively distant wavelengths such as a wavelength of 1.3 μm and a wavelength ranging from 1.5 to 1.6 μm may be used at the same time.

According to NPL 1, in a GE-PON (G-PON) system that has already been introduced, a wavelength ranging from 1260 nm to 1360 nm (only a regular band is described in G-PON) is used as a signal from a user to a station (an uplink signal). Further, in a G-PON system, a wavelength ranging from 1480 nm to 1500 nm is used as a signal from a station to a user (a downlink signal), and a wavelength ranging from 1550 nm to 1560 nm is used as a downlink video signal.

Similarly, in a 10G-EPON (XG-PON) system, which is scheduled to be introduced in the future, a wavelength of 1.3 μm and a wavelength ranging from 1.5 to 1.6 μm are used. In an NG-PON2 system, which has been standardized recently, a wavelength ranging from 1524 nm to 1544 nm (a wide band) is used for an uplink signal, a wavelength ranging from 1596 nm to 1603 nm is used for a downlink signal, and a wavelength ranging from 1550 nm to 1560 nm is used for a downlink video signal. Description of an optional point to point wavelength division multiplex (PtP WDM) overlay is omitted. In this system, wavelength multiplexing is performed, unlike GE-PON (G-PON) and 10G-EPON (XG-PON). The wavelength allocation is illustrated in FIG. 27.

Incidentally, in a PON system such as GE-PON, optical power is confirmed in an opening test. In the future, more various wavelengths will be used in a transition from GE-PON to 10G-EPON. In a test in such a situation, when a wavelength can be confirmed, a type of signal can be discriminated, failure can be easily isolated, and work efficiency is likely to be improved.

CITATION LIST

Non Patent Literature

NPL 1: Ryo Koma et al., "Standardization Trends for Future High-speed Passive Optical Networks," NTT Technology Journal, August 2017, pages 51-53.

SUMMARY

Technical Problem

Incidentally, examples of means for measuring a wavelength include an optical spectrum analyzer. However, because the optical spectrum analyzer includes a movable part for allowing a detector to detect diffracted light obtained through movement of a diffraction grating, a device is large and heavy, and thus is poor in portability. Further, there is also a drawback that a power supply for 100 V is generally required. Thus, in the related art, there is a problem that it is not possible to easily perform, for example, confirmation as to whether signal light is coming in opening and failure isolation investigation of a PON system.

Embodiments of the present invention have been made in order to solve the above problem, and an object of embodiments of the present invention is to easily perform confirmation as to whether there is signal light in opening, failure isolation investigation, or the like of a PON system.

Means for Solving the Problem

A wavelength checker according to embodiments of the present invention is a wavelength checker including an optical waveguide chip and an optical conversion unit, the optical conversion unit being composed of a conversion material that converts near-infrared light into visible light, in which the optical waveguide chip on a side connected to an optical fiber includes an arrayed waveguide grating and is mounted on a main substrate, a light emitting-side end surface of the optical waveguide chip on a side from which light is output to an external space is a reflection surface inclined to face the main substrate, and the optical conversion unit is provided at a location, on the optical waveguide chip, from which light reflected on the light emitting-side end surface is output to the external space.

Effects of Embodiments of the Invention

As described above, according to embodiments of the present invention, the light emitting-side end surface of the optical waveguide chip located on the side from which light is output to the external space is a reflection surface inclined so as to face the main substrate, and is disposed at a portion from which light reflected at the light emitting-side end surface is output to the external space, so that confirmation as to whether there is signal light in opening, failure isolation investigation, or the like of a PON system can be easily performed.

BRIEF DESCRIPTION OF THE DRAWINGS

FIG. 12 is a characteristic diagram illustrating a result of calculation of a transmission spectrum of an arrayed waveguide grating in a child optical waveguide chip 121a.

FIG. 20 is a characteristic diagram illustrating a result of calculation of a transmission spectrum of the child optical waveguide chip 101a plus the child optical waveguide chip 121a.

FIG. 22 is a characteristic diagram illustrating a result of calculation of a spectrum of light that is transmitted through the child optical waveguide chip 101a and the child optical waveguide chip 121a when a second input waveguide 128 of the child optical waveguide chip 121a is connected to the port 7 of the first output waveguide 107 of the child optical waveguide chip 101a.

FIG. 23 is a characteristic diagram illustrating a result of calculation of a transmission spectrum of a port 6 of the child optical waveguide chip 101a.

FIG. 24 is a characteristic diagram illustrating a result of calculation of a spectrum of light that is transmitted through the child optical waveguide chip 101a and the child optical waveguide chip 121a in a configuration in which light is input from a sub first input waveguide 106b to an arrayed waveguide grating of the child optical waveguide chip 101a and the second input waveguide 128 of the child optical waveguide chip 121a is connected to the port 6 in the first output waveguide 107 of the child optical waveguide chip 101a.

DETAILED DESCRIPTION OF ILLUSTRATIVE EMBODIMENTS

Figure 1:
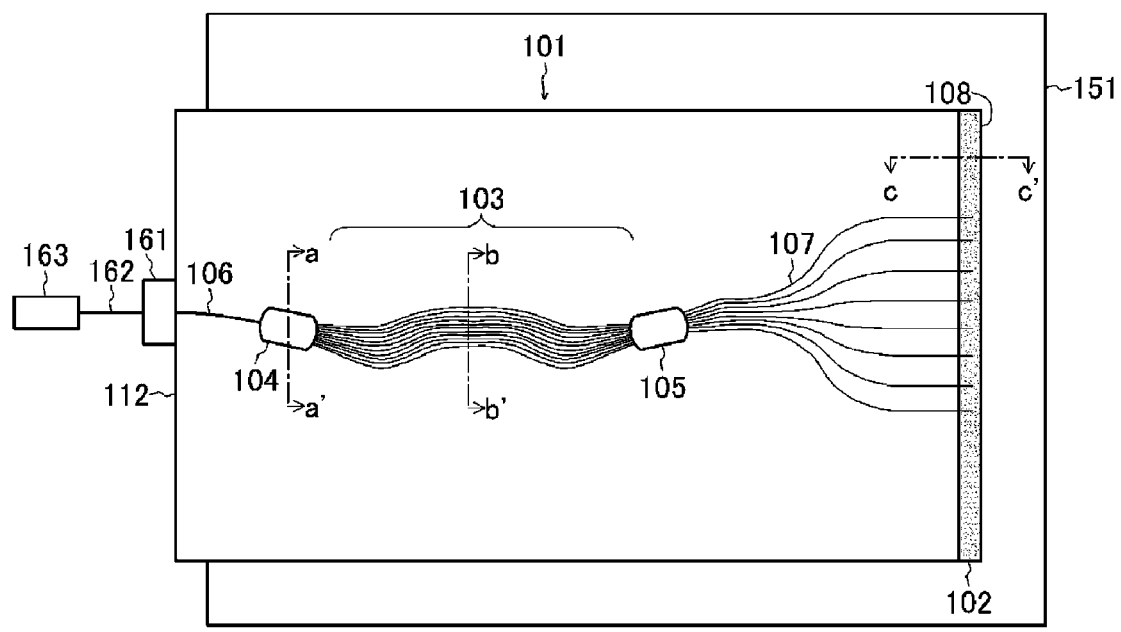
FIG. 1 is a plan view illustrating a configuration of a wavelength checker according to a first embodiment of the present invention.

Hereinafter, a wavelength checker according to embodiments of the present invention will be described.

First Embodiment

First, a wavelength checker according to a first embodiment of the present invention will be described with reference to FIG. 1.

The wavelength checker includes an optical waveguide chip 101. A known arrayed waveguide grating is formed on the optical waveguide chip 1o1 (see Reference 3). The arrayed waveguide grating includes a first arrayed waveguide 103, a first input-side slab waveguide 104, a first output-side slab waveguide 105, a first input waveguide 106, and a first output waveguide 107. In FIG. 1, a plan view of the wavelength checker is illustrated. Note that a reference sign 151 denotes a main substrate, and a reference sign 102 denotes an optical conversion unit composed of a conversion material that converts near-infrared light into visible light. A reference sign 161 denotes a fiber block, a reference sign 162 denotes an optical fiber, and a reference sign 163 denotes a connector.

The first arrayed waveguide 103 includes a plurality of waveguides having a constant optical path length difference. In the first arrayed waveguide 103, the optical path length difference between two adjacent waveguides is constant. The first input-side slab waveguide 104 is connected to an optical input end of the first arrayed waveguide 103. The first output-side slab waveguide 105 is connected to an optical output end of the first arrayed waveguide 103. The first input waveguide 106 is connected to an input side of the first input-side slab waveguide 104. A plurality of the first output waveguides 107 are provided and connected to an output side of the first output-side slab waveguide 105.

Furthermore, the wavelength checker includes the optical conversion unit 102 composed of a conversion material that converts infrared light to visible light. The optical conversion unit 102 is disposed to receive emitted light that is guided through the first output waveguides 107, reflected at a light emitting-side end surface 108, and emitted, on the output side (side from which light is output to an external space) of the plurality of first output waveguides 107 of the optical waveguide chip 101. The light emitting-side end surface 108 is a reflection surface that is inclined so as to face the main substrate 151.

For example, the light emitting-side end surface 108 can be used as a reflection surface (mirror) by forming a reflective film made of a dielectric multilayer film, a metal film such as an Al film, or the like on the light emitting-side end surface 108 by vapor deposition or the like. In addition, even if the reflective film is not formed, due to a refractive index difference between the light emitting-side end surface 108 composed of quartz glass or the like and air, an interface between the light emitting-side end surface and the air can be used as a reflection surface. In particular, when an angle of the light emitting-side end surface 108 with respect to a waveguide direction of light guided through the optical waveguide chip 101 satisfies a total reflection condition, it is possible to suppress leakage of light to the external space from the light emitting-side end surface 108.

The optical conversion unit 102 is formed to extend in a direction in which the plurality of first output waveguides 107 are aligned. The optical conversion unit 102 extends from one end side to the other end side of the alignment of the plurality of first output waveguides 107, for example.

The conversion material is, for example, a phosphor or fluorescent substance that converts near-infrared light to visible light. The conversion material is mixed with, for example, a thermosetting silicone resin, and the resultant mixture is heated and cured to form the optical conversion unit 102. Instead of the silicone resin, a polymer resin or an optical adhesive may be used. Alternatively, for the conversion material, for example, a phosphor made by "Lumitek International, Inc." can be used. As an example of the phosphor, a type of phosphor to which electronic trapping is applied retains optical energy by being irradiated with sunlight or room light in advance, and then emits the retained optical energy as visible light by stimulation of irradiation with near-infrared rays. For example, there is a phosphor having a sensitivity ranging from 700 nm to 1700 nm.

According to the wavelength checker of the first embodiment, when near-infrared light that is demultiplexed for each wavelength by the arrayed waveguide grating, guided through the first output waveguides 107, reflected on and emitted from the light emitting-side end surface 108 reaches the optical conversion unit 102, visible light is generated. The generated visible light spreads isotropically, not limited to an incident direction of the near-infrared light that is guided through the first output waveguides 107 and reflected on the light emitting-side end surface 108, and can be viewed from various directions. In addition, the visible light is generated from a location where the near-infrared light reflected on the light emitting-side end surface 108 has reached, and thus it is possible to identify a first output waveguide 107 through which the near-infrared light has been guided, from the location where the visible light has been generated. Because a wavelength of the near-infrared light that is demultiplexed in and guided through each of the first output waveguides 107 is known, it is possible to confirm the wavelength by observing a location where the visible light has been generated (is visible).

Figure 2A:
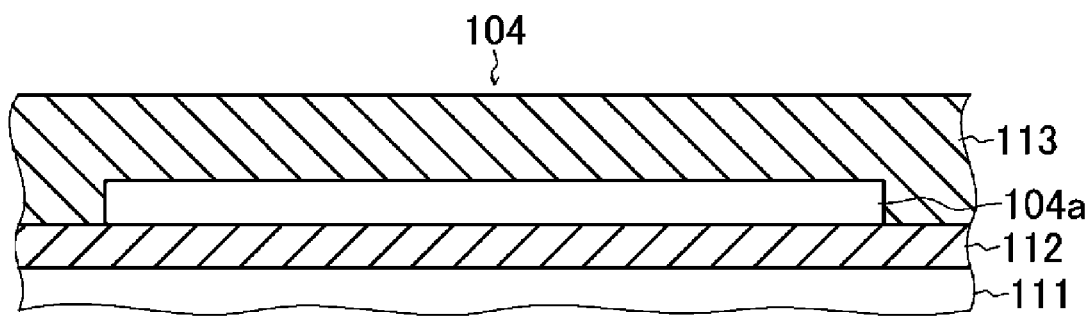
FIG. 2A is a cross-sectional view illustrating a partial configuration of the wavelength checker according to the first embodiment of the present invention.

Here, as illustrated in FIG. 2A, the first input-side slab waveguide 104 includes a lower cladding layer 112 formed on, for example, a Si substrate in made of Si, a core portion 104a formed on the lower cladding layer 112, and an upper cladding layer 113 formed on the core portion 104a. FIG. 2A illustrates a cross section taken along line a-a' in FIG. 1. In FIG. 2A, the main substrate 151 located below the Si substrate 111 is omitted.

Figure 2B:
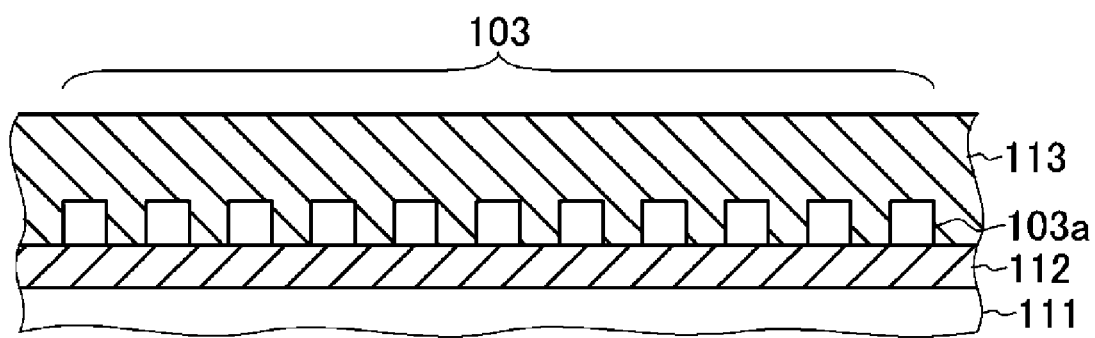
FIG. 2B is a cross-sectional view illustrating a partial configuration of the wavelength checker according to the first embodiment of the present invention.

Further, as illustrated in FIG. 2B, the first arrayed waveguide 103 includes the lower cladding layer 112 formed on the Si substrate 111, a plurality of core portions 103a formed on the lower cladding layer 112, and the upper cladding layer 113 formed on the plurality of core portions 103a. FIG. 2B illustrates a cross section taken along line b-b' of FIG. 1. For example, the Si substrate 111 is a silicon substrate, each of the cladding layers includes quartz-based glass, and the core portions 103a and the core portion 104a are composed of quartz-based glass. Note that in FIG. 2B, the main substrate 151 located below the Si substrate 111 is omitted.

Figure 2C:
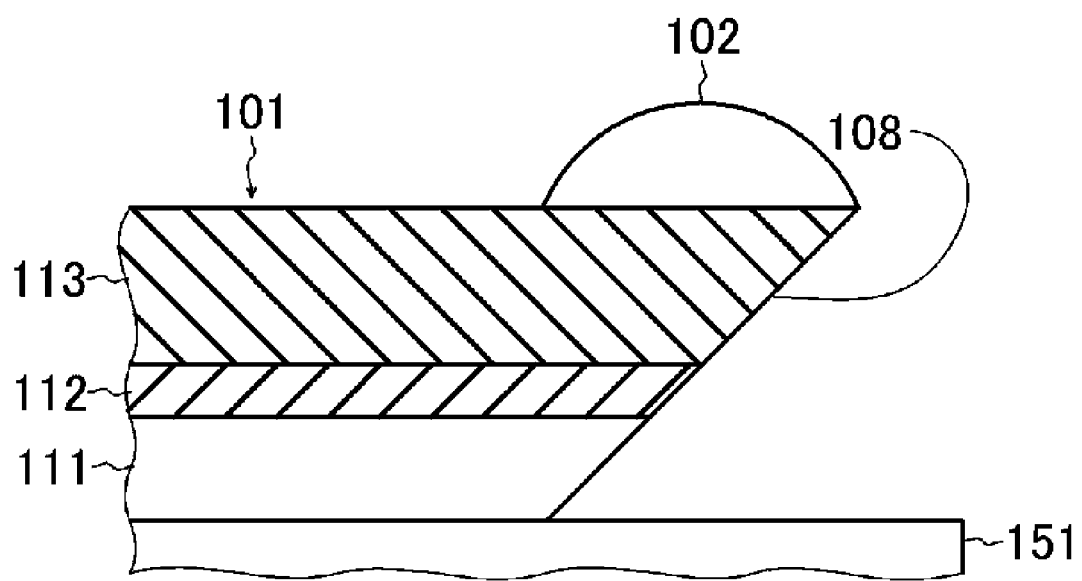
FIG. 2C is a cross-sectional view illustrating a partial configuration of the wavelength checker according to the first embodiment of the present invention.

As illustrated in FIG. 2C, the light emitting-side end surface 108 is made to have an angle of 45° with respect to the plane of the main substrate 151. Further, the optical conversion unit 102 is provided on the optical waveguide chip 101 at a location from which light reflected on the light emitting-side end surface 108 is output to the external space. In this manner, when the light emitting-side end surface 108 is made to have 45°, light that has been guided through the output waveguides of the optical waveguide chip 101 is reflected on the light emitting-side end surface 108 and is emitted in a direction perpendicular to the plane of the main substrate 151. Note that definition of the angle of the light emitting-side end surface 108 corresponds to θ described later. FIG. 2C illustrates a cross section taken along line c-c' of FIG. 1.

Here, the arrayed waveguide grating will be described in more detail. Hereinafter, a case in which the first arrayed waveguide 103 includes eight waveguides and eight first output waveguides 107 are provided will be described as an example (FIG. 1 illustrates that the first arrayed waveguide 103 includes eleven waveguides, but the first arrayed waveguide 103 includes more waveguides in practice). In this arrayed waveguide grating, multiplexed light having eight wavelengths input to the first input waveguide 106 is branched into eight outputs.

First, the multiplexed light input to the first input waveguide 106 is diffracted and spread by the first input-side slab waveguide 104, and the light is coupled to the respective waveguides of the first arrayed waveguide 103 and guided. In the first arrayed waveguide 103, an optical path length is long on the upper side of a paper surface of FIG. 1 (the outer side), and each optical path length is gradually shortened by an equal distance toward the lower side of the paper surface of FIG. 1 (the inner side). An output end of the first arrayed waveguide 103 has a phase difference along from the waveguide on the outer side to the waveguide on the inner side of the first arrayed waveguide 103. Thus, when the light is incident on the first output-side slab waveguide 105, an inclination of a fan-shaped equiphase surface caused by a shape of the slab waveguide changes depending on the wavelength, and for each wavelength, the light is condensed (optically coupled) to the corresponding first output waveguides 107. As a result, the arrayed waveguide grating can branch (demultiplex) the wavelength-multiplexed light for each wavelength.

Figure 3:
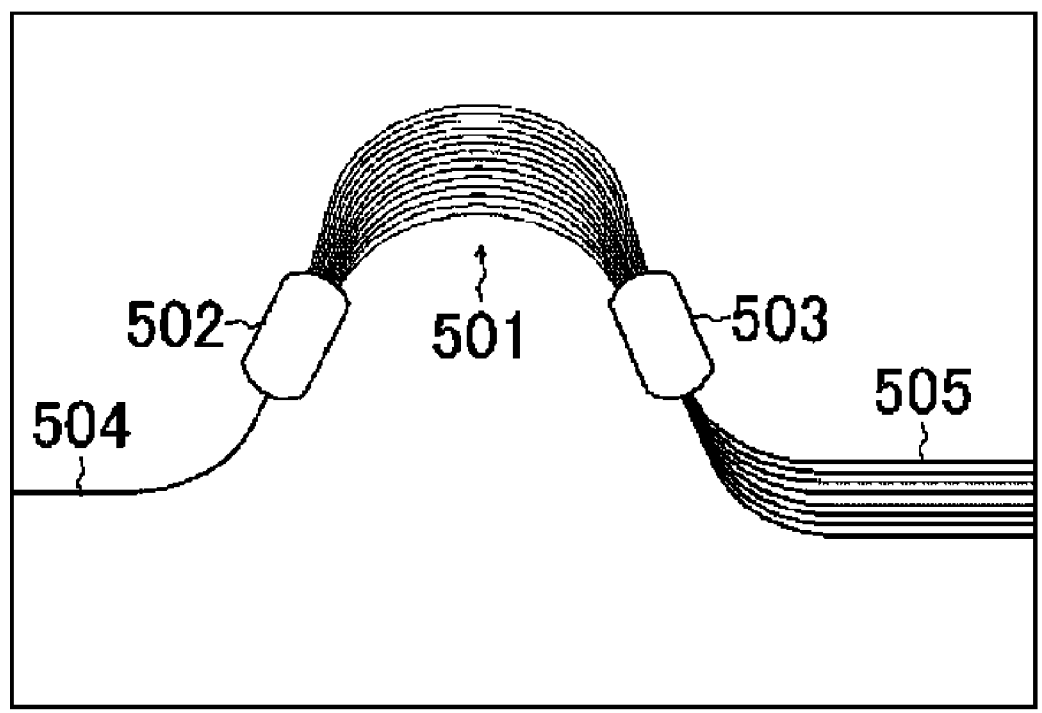
FIG. 3 is a plan view illustrating a configuration of an arrayed waveguide grating.

In a commonly used arrayed waveguide grating, an arrayed waveguide 501 is bent at one place like an arc in a plan view, as illustrated in FIG. 3. The arrayed waveguide grating includes an input waveguide 504, an input-side slab waveguide 502, M arrayed waveguides 501, an output-side slab waveguide 503, and N output waveguides 505. Light having N wavelengths input into the arrayed waveguide grating is branched into N outputs.

As an operating principle, the input light is diffracted and spread by the input-side slab waveguide 502, and the light is coupled to each of the M arrayed waveguides 501 and guided. In the M arrayed waveguides 501, an optical path length is long on the outer side and is gradually shortened by an equal optical path length difference toward the inner side. An output end of each of the M arrayed waveguides 501 has a phase difference along from the waveguide on the outer side to the waveguide on the inner side. Thus, when the light is incident on the output-side slab waveguide 503, an inclination of a fan-shaped equiphase surface caused by a shape of the output-side slab waveguide 503 in a plan view changes depending on the wavelength, and, for each wavelength, the light is condensed to each of the N output waveguides 505. Therefore, wavelength multiplexed light can be branched for each wavelength.

On the other hand, in the arrayed waveguide grating according to the embodiment, the first arrayed waveguide 103 is bent at a plurality of locations in a plan view and has a shape like a seagull wing in a plan view. This point will be described below.

Hereinafter, an optical path length of each of the waveguides constituting the first arrayed waveguide 103 of the arrayed waveguide grating according to the embodiment will be described in detail. When the optical path length difference between adjacent waveguides in the first arrayed waveguide 103 is ΔL, a central wavelength $\lambda_0$ of the arrayed waveguide grating is expressed by Equation (i) below. The central wavelength $\lambda_0$ is normally a central transmission wavelength of a central port among output ports of the arrayed waveguide grating. In Equation (i), $n_c$ represents an effective refractive index of the arrayed waveguide, and m represents a diffraction order.

In this example, from the upper side of the paper surface of FIG. 1, an output end of the first output waveguide 107 of the uppermost stage is a port 1, an output end of the first output waveguide 107 of the second uppermost stage is a port 2, an output end of the first output waveguide 107 of the third uppermost stage is a port 3, an output end of the first output waveguide 107 of the fourth uppermost stage is a port 4, an output end of the first output waveguide 107 of the fifth uppermost stage is a port 5, an output end of the first output waveguide 107 of the sixth uppermost stage is a port 6, an output end of the first output waveguide 107 of the seventh uppermost stage is a port 7, and an output end of the first output waveguide 107 of the eighth uppermost stage is a port 8.

Math 1

$$\lambda_0 = \frac{n_c \Delta L}{m} \quad (1)$$

A free spectral range (FSR) of the arrayed waveguide grating is expressed by Expression (2) below.

Math 2

$$FSR \cong \frac{\lambda_0}{m} \quad (2)$$

See Reference 1 and Reference 2 for Equation (1) and Expression (2).

For example, when the free spectral range (FSR) of the arrayed waveguide grating is set to 400 nm or more with a wavelength of 1250 nm to 1650 nm, the central wavelength $\lambda_0$ is designed to be 1450 nm, the wavelength interval is designed to be 50 nm, and the first output waveguides 107 are designed to be eight output waveguides, an entire wavelength range of the access-type PON system described above is covered. In this case, the central wavelength of FSR is 1450 nm. Thus, the diffraction order m is set to any one of 1 to 3 in view of Equation (2).

Here, the optical path length difference ΔL becomes a minute length on the order of μm in view of Equation (1), which cannot be achieved by an arc structure in which the first arrayed waveguide 103 is bent at only one place. Thus, in the embodiment, the first arrayed waveguide 103 has a structure in which the first arrayed waveguide 103 is bent at a plurality of portions including a central portion and portions on both sides (both side portions) in a plan view. In this way, by providing the plurality of bent portions, it is possible to reverse a change in the optical path length from the upper side of the paper surface of FIG. 1 (the outer side) to the side of the paper surface of FIG. 1 (the inner side) at the different bent portions of the first arrayed waveguide 103.

For example, the first arrayed waveguide 103 is bent to be convex outward in a plan view at the central portion, and is bent to be convex inward in a plan view at both side portions sandwiching the central portion. With this configuration, in the central portion of the first arrayed waveguide 103, the optical path length becomes longer toward the outside (the upper side of the paper surface of FIG. 1), and the optical path length becomes shorter toward the outside at both side portions. The optical path length difference between the adjacent waveguides in the central portion of the first arrayed waveguide 103 and the adjacent optical path length difference in both side portions are set to different values, and a change in optical path length in the central portion and a change in optical path length in both side portions are offset to some extent, so that a minute optical path length difference in the entire first arrayed waveguide 103 can be set. A detailed design of the optical path length difference described above is described in Reference 3.

Figure 4:
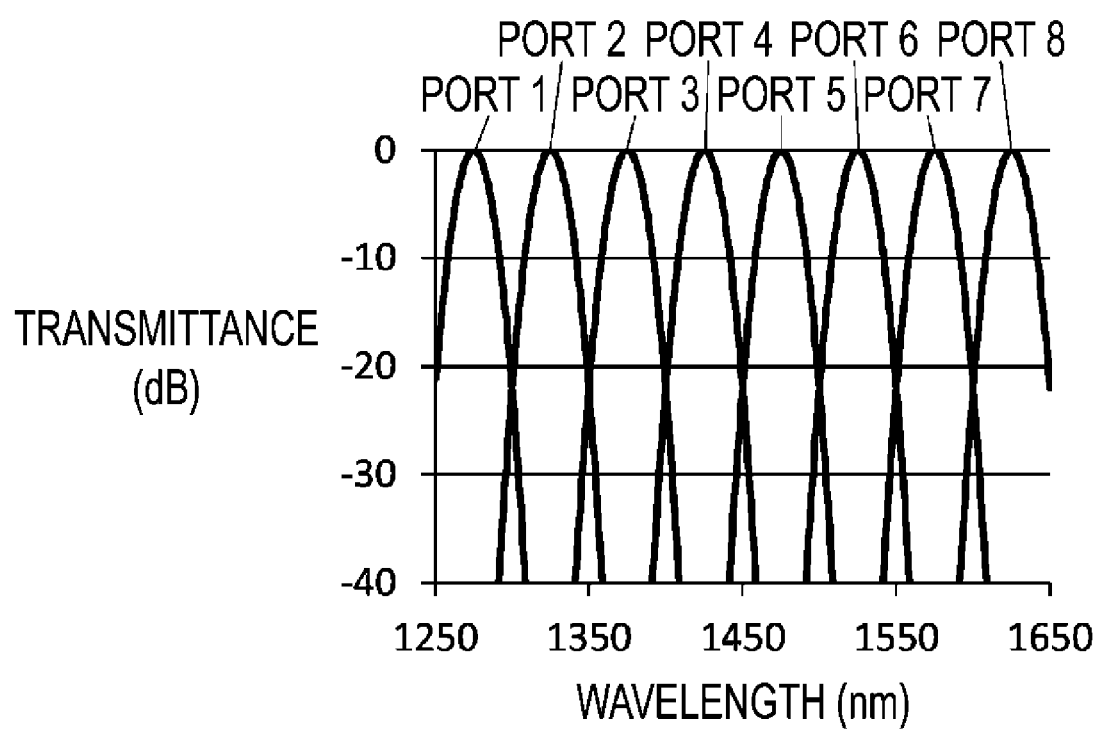
FIG. 4 is a characteristic diagram illustrating a result of calculation of a transmission spectrum of an arrayed waveguide grating in an optical waveguide chip 101.

A function of a transmission spectrum of the arrayed waveguide grating (optical waveguide chip 101) is represented by a Gaussian function. An example of a calculation result is illustrated in FIG. 4. A central transmission wavelength of the output port 1 is 1275 nm. A central transmission wavelength of the output port 2 is 1325 nm. A central transmission wavelength of the output port 3 is 1375 nm. A central transmission wavelength of the output port 4 is 1425 nm. A central transmission wavelength of the output port 5 is 1475 nm. A central transmission wavelength of the output port 6 is 1525 nm. A central transmission wavelength of the output port 7 is 1575 nm. A central transmission wavelength of the output port 8 is 1625 nm.

The function of the transmission spectrum will be described. A transmission function of the arrayed waveguide grating can be expressed by Equation (3) when a loss is ignored (see Reference 2).

Math 3

$$T(\delta f) = \exp\left\{-\left(\frac{\Delta x \delta f}{\omega_0 \Delta f}\right)^2\right\} \quad (3)$$

In Equation (3), of is a deviation from a central transmission frequency, $\Delta x$ is an interval between center positions of the first output waveguides 107 connected to the first output-side slab waveguide 105, $\Delta f$ is an interval between central frequencies of adjacent channels, and $\omega_0$ is a spot size.

Here, when $\delta\lambda$ is a deviation from a central transmission wavelength and $\Delta\lambda$ is an interval between central wavelengths of the adjacent channels, Expression (4) below is established, and when Expression (4) is substituted into Equation (3), Expression (5) is obtained. Equation (3) represented in a frequency domain is represented in a wavelength range by Equation (5).

Math 4

$$\frac{\delta\lambda}{\Delta\lambda} \cong \frac{\delta f}{\Delta f} \quad (4)$$

$$T(\delta\lambda) \cong \exp\left\{-\left(\frac{\Delta x \delta\lambda}{\omega_0 \Delta\lambda}\right)^2\right\} \quad (5)$$

FIG. 4 illustrates a result of a transmission spectrum of each channel of the arrayed waveguide grating calculated using Expression (5). A parameter $\Delta x/\omega_0$ representing steepness of the Gaussian function can be adjusted at the time of designing the arrayed waveguide grating, and this parameter $\Delta x/\omega_0$ is set to 4.5 in the embodiment.

Second Embodiment

Figure 5A:
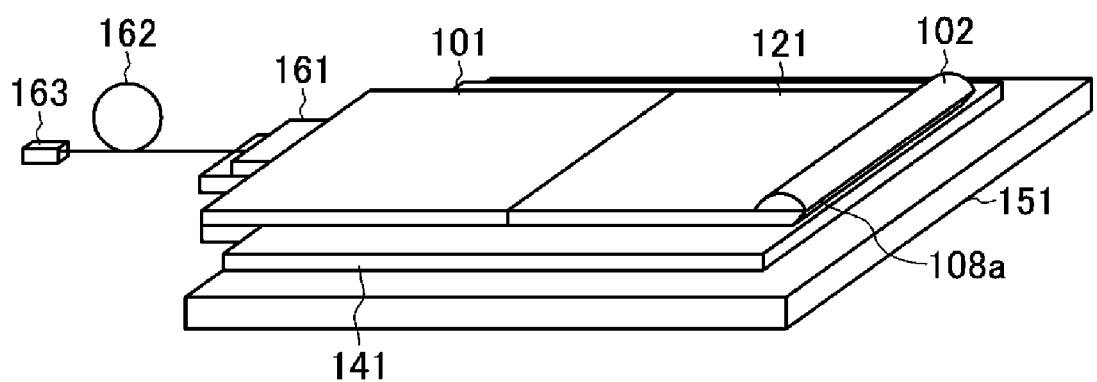
FIG. 5A is a perspective view illustrating a configuration of a wavelength checker according to a second embodiment of the present invention.
Figure 5B:
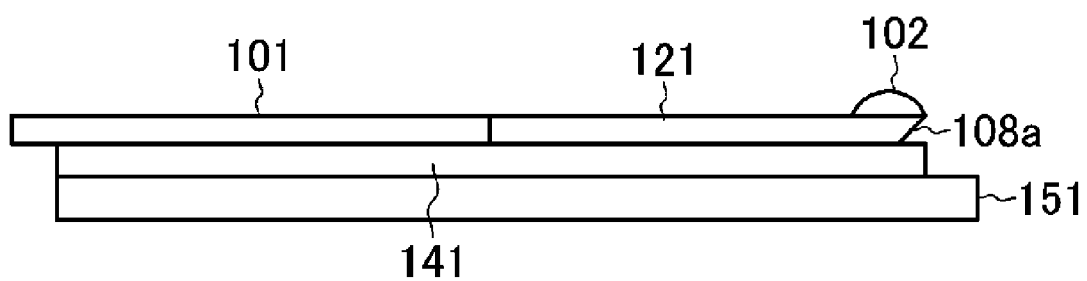
FIG. 5B is a side view illustrating a partial configuration of the wavelength checker according to the second embodiment of the present invention.
Figure 5C:
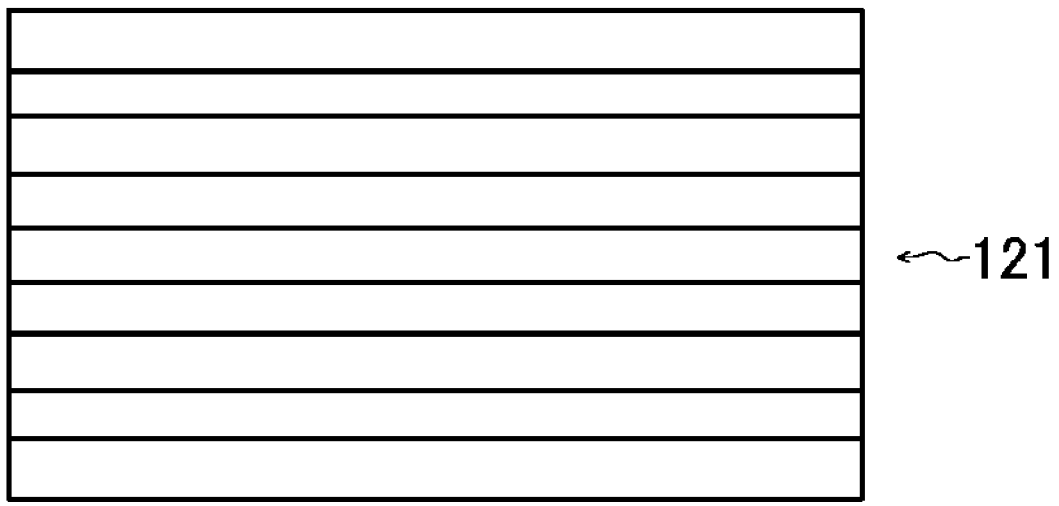
FIG. 5C is a plan view illustrating a partial configuration of the wavelength checker according to the second embodiment of the present invention.

Next, a wavelength checker according to a second embodiment of the present invention will be described with reference to FIG. 5A, FIG. 5B, and FIG. 5C.

The wavelength checker includes an optical waveguide chip 101. The optical waveguide chip 101 is the same as that of the above-described first embodiment. The wavelength checker further includes an optical waveguide chip 121 that is arranged side by side with the optical waveguide chip 101 and includes an optical waveguide through which emitted light is guided. A plurality of linear optical waveguides are formed in the optical waveguide chip 121. For example, the optical waveguide chip 121 is formed with eight linear optical waveguides corresponding to eight output waveguides of the optical waveguide chip 101. In addition, the eight linear optical waveguides are arrayed at interval of 1 mm that is the same as the interval between the output ends of the eight output waveguides of the optical waveguide chip 101.

In the second embodiment, a light emitting-side end surface 108a of the optical waveguide chip 121 on the side from which light is output to an external space is a reflection surface inclined so as to face a main substrate 151. An optical conversion unit 102 is provided at a location on the optical waveguide chip 121 from which light reflected on the light emitting-side end surface 108a is output to the external space. The optical conversion unit 102 is the same as that of the above-described first embodiment. Further, the optical waveguide chip 121 is placed in series with the optical waveguide chip 101 in the waveguide direction.

In the second embodiment, the optical waveguide chip 101 and the optical waveguide chip 121 are mounted on an optical waveguide chip 141. In other words, two layers are laminated. A lower optical waveguide chip is defined as a parent optical waveguide chip, and an upper optical waveguide chip is defined as a child optical waveguide chip. Accordingly, in the following description, optical waveguide chips will be referred to as the child optical waveguide chip 101, the child optical waveguide chip 121, and the parent optical waveguide chip 141.

The parent optical waveguide chip 141 may have a planar lightwave circuit formed thereon or may have no optical circuit (only cladding glass on the Si substrate). The child optical waveguide chip 101 and the child optical waveguide chip 121 are mounted on the parent optical waveguide chip 141 with a spacer (not illustrated) interposed therebetween such that a surface (surface on which the cladding glass is located) of each of the child optical waveguide chip 101 and the child optical waveguide chip 121, on which optical waveguides (planar lightwave circuit) are formed, is directed to (a surface, on which the cladding glass is located, of) the parent optical waveguide chip 141.

Here, an optical waveguide chip through which light is to be transmitted is the child optical waveguide chip. When the surface on which the cladding glass is located is used as a front surface, a back surface of the child optical waveguide chip, on which the Si substrate is located, is visible when the child optical waveguide chip is viewed from above. In other words, in the child optical waveguide chip, a portion of the optical circuit including a core and a clad is provided on the lower side. On the other hand, the parent optical waveguide chip 141 is mounted on the main substrate 151. For example, the parent optical waveguide chip 141 is bonded and fixed with an adhesive onto the main substrate 151. In addition, the child optical waveguide chip 101 and the child optical waveguide chip 121 are arranged vertically along the input direction of light.

For example, the optical conversion unit 102 can be formed by applying a conversion material that converts infrared light to visible light to an upper surface of the child optical waveguide chip 121 where may be the light emitting-side end surface 108a.

In the second embodiment, light is input to the child optical waveguide chip 101, dispersed by the child optical waveguide chip 101, and output through the child optical waveguide chip 121. The light emitting-side end surface 108a on the output side of the child optical waveguide chip 121 is made oblique, and light coming through the optical waveguides of the child optical waveguide chip 121 is reflected on the light emitting-side end surface 108a. The substrate of the child optical waveguide chip 121 is typically Si or quartz, through which infrared light is transmitted. Thus, light coming through the optical waveguides of the child optical waveguide chip 121 is emitted from the side on which the substrate is located.

The optical conversion unit 102 is formed at the location where light is emitted. Thus, light (near-infrared light) reflected on the light emitting-side end surface 108a and emitted (output) from the substrate is converted to visible light by the optical conversion unit 102 to become recognizable by the eye (visible). The output waveguides of the child optical waveguide chip 101 and the waveguide group of the child optical waveguide chip 121 are arranged, for example, at 1 mm intervals, and thus by confirming a shiny location, it is possible to recognize a waveguide of the child optical waveguide chip 121 and a waveguide of the child optical waveguide chip 101 through which light passes. In addition, when a relationship between port numbers of waveguides and demultiplexed wavelengths is grasped in advance, it is possible to recognize coming of light and a wavelength of the light.

Note that as described above, in the second embodiment, light reflected on the light emitting-side end surface 108a is emitted from the substrate side, so that the position of the waveguide cannot be directly confirmed visually. Accordingly, when marks corresponding to the positions of the waveguides are provided on the light emitting side (back surface) of the substrate, the position of a waveguide is easily confirmed. The marks can be formed by, for example, impressing with a laser such as YAG. Alternatively, a tape on which a 1 mm spacing scale is drawn is attached, so that the position of a waveguide is easily confirmed.

Further, a fiber block 161 is connected to an input waveguide end of the child optical waveguide chip 101. An optical fiber 162 provided with a connector 163 for inputting an optical signal to be confirmed is connected to the fiber block 161. An optical fiber with a connector (not illustrated) is separately used for alignment of the fiber block 161 and an input waveguide of the child optical waveguide chip 101. In addition, the child optical waveguide chip 101 is bonded and fixed with an adhesive to the parent optical waveguide chip 141 with a spacer (not illustrated) interposed therebetween. On the other hand, the child optical waveguide chip 121 is in a semi-fixed state and can be attached to and detached from the parent optical waveguide chip 141 to be replaceable.

Figure 6A:
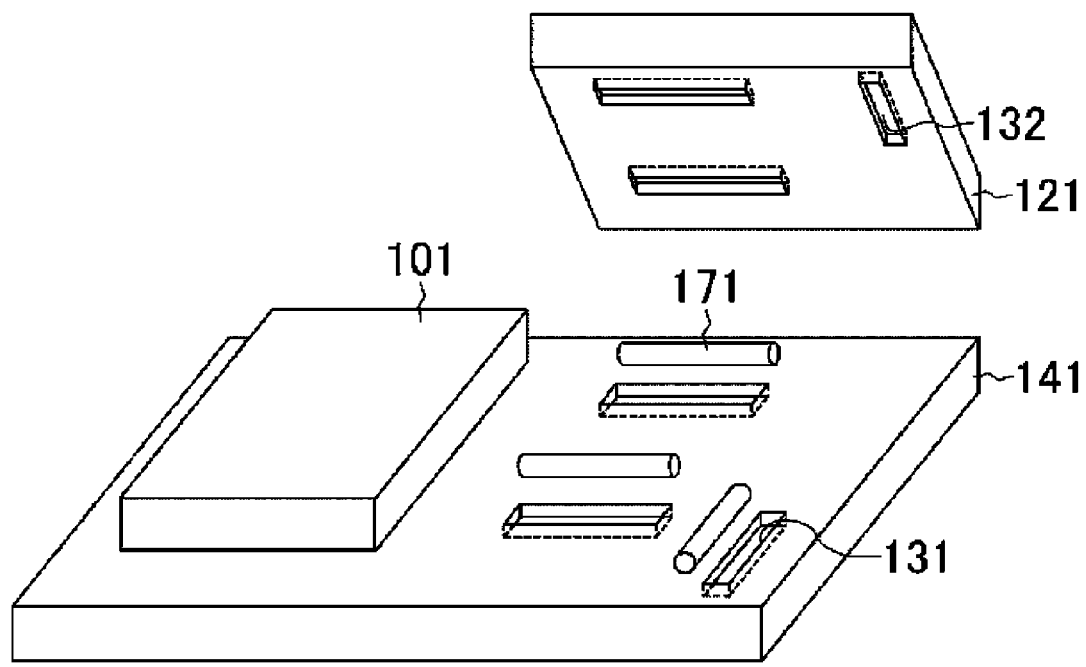
FIG. 6A is a perspective view illustrating a partial configuration of the wavelength checker according to the second embodiment of the present invention.
Figure 6B:
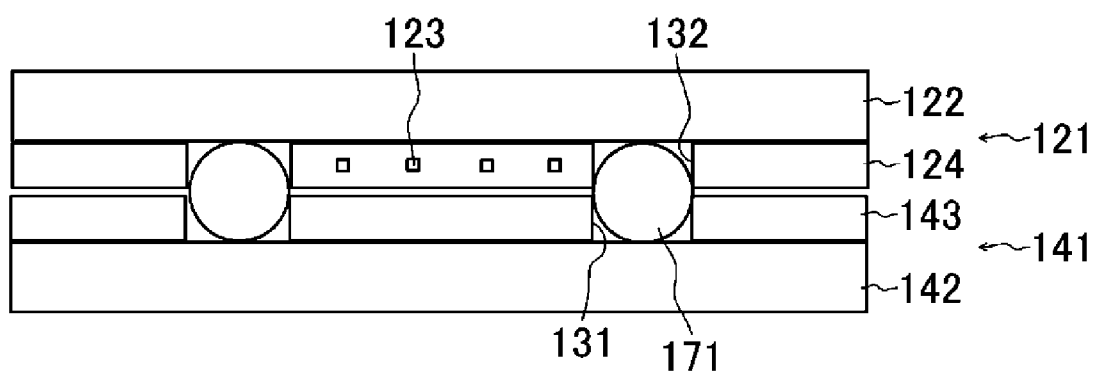
FIG. 6B is a cross-sectional view illustrating a partial configuration of the wavelength checker according to the second embodiment of the present invention.

Here, positioning of the child optical waveguide chip 101 and the child optical waveguide chip 121 on the parent optical waveguide chip 141 will be described with reference to FIG. 6A and FIG. 6B. First, a plurality of first grooves 131 are formed in the parent optical waveguide chip 141, and a second groove 132 is formed in each of the child optical waveguide chip 101 and the child optical waveguide chip 121. In addition, a plurality of spacer members 171 are fitted in the plurality of first grooves 131 in a form in which the plurality of spacer members 171 partially protrude from the parent optical waveguide chip 141. Further, a protruding portion of any of the plurality of spacer members 171 is also fitted in each of the second groove 132 of the child optical waveguide chip 101 and the second groove 132 of the child optical waveguide chip 121. Note that positions of the second grooves 132 are determined to be separate from the waveguide portion (core) portions of the child optical waveguide chip 101 and the child optical waveguide chip 121. Three or more grooves are normally required.

The first grooves 131 are formed in a cladding layer 143 of the parent optical waveguide chip 141. The first grooves 131 are formed to penetrate the cladding layer 143 and reach a substrate 142. Similarly, the second grooves 132 are formed in a cladding layer 124 including a core 123 of the child optical waveguide chip 121. The second grooves 132 are formed to penetrate the cladding layer 124 and reach a substrate 122.

The first grooves 131 and the second grooves 132 can be formed by a photolithography technique and an etching technique (such as reactive ion etching). The first grooves 131 are formed by etching the cladding layer 143 using a mask pattern formed by the photolithography technique as a mask and using the substrate 142 as an etching stop layer. Similarly, the second grooves 132 is formed by etching the cladding layer 124 using a mask pattern formed by the photolithography technique as a mask and using the substrate 122 as an etching stop layer.

The accuracy of a position (amount of displacement) in a surface direction with respect to the design of the first grooves 131 and the second grooves 132 formed in this manner is determined by the positional accuracy of the mask pattern and the amount of displacement of the position during etching. As is well known, the positional accuracy of the mask pattern is submicron or less, and the positional displacement in reactive ion etching is also submicron or less. Accordingly, the positions in the surface direction where the first grooves 131 and the second grooves 132 are formed are 1 μm or less with respect to the design.

The depth of each of the first grooves 131 is determined by the thickness of the cladding layer 143, and the depth of each of the second grooves 132 is determined by the thickness of the cladding layer 124. The accuracy of the thickness of the cladding layer 143 and the accuracy of the thickness of the cladding layer 124 are determined on the order of submicron, for example, by a well-known glass deposition technique. The same applies to the position in the thickness direction of the core 123 embedded in the cladding layer 124.

Here, the spacer members 171 can be formed by, for example, cutting an optical fiber to a predetermined length and the accuracy of a diameter of each of the spacer members 171 can be determined on the order of submicron. Accordingly, the positional accuracy in the thickness direction of the child optical waveguide chip 121 is also determined in a range of 1 μm or less.

As described above, between the child optical waveguide chip 101 and the child optical waveguide chip 121 mounted on the parent optical waveguide chip 141, positions of core centers of corresponding optical waveguides can be accurately matched with each other. Note that in general, alignment among a plurality of child chips mounted on a parent optical chip as described above is performed under conditions where warping does not occur in each of the chips. For more detailed description, see Reference 4, Reference 5, and Reference 6. This optical implementation is referred to as a pluggable photonic circuit platform (PPCP). The child optical waveguide chip 121 implemented by the PPCP is characterized by being detachable. As a result, child optical waveguide chips 121 having various functions can be replaced to be used, and it is possible to flexibly impart various functions to the wavelength checker. That is, it can be said that the PPCP has features such as an optical circuit (optical chip) version of an electronic block.

Furthermore, the positional accuracy between the child optical waveguide chip 101 and the child optical waveguide chip 121 is guaranteed as described above, and thus a transmission spectrum output from the child optical waveguide chip 121 is also represented by the spectrum in FIG. 4.

Next, production of the child optical waveguide chip 121 will be described with reference to FIG. 7A to FIG. 7E.

Figure 7A:
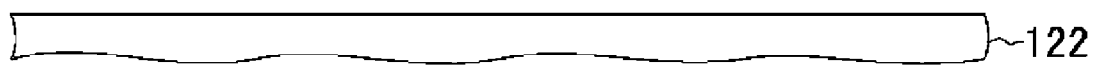
FIG. 7A is a cross-sectional view for explaining a method for producing a child optical waveguide chip that forms the wavelength checker according to the second embodiment of the present invention.
Figure 7B:
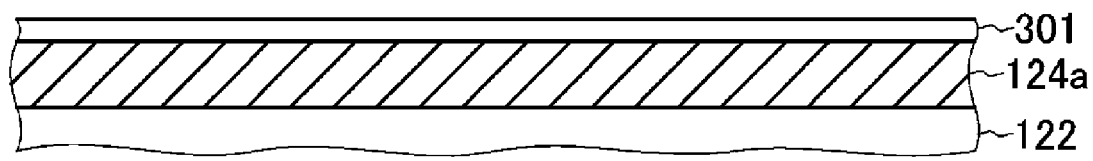
FIG. 7B is a cross-sectional view for explaining the method for producing the child optical waveguide chip that forms the wavelength checker according to the second embodiment of the present invention.

First, as illustrated in FIG. 7A, the substrate 122 made of Si is prepared. Then, as illustrated in FIG. 7B, a lower cladding layer 124a is formed on the substrate 122, and a core forming layer 301 is formed on the lower cladding layer 124a.

For example, the lower cladding layer 124a and the core forming layer 301 can be formed using a flame hydrolysis deposition (FHD) method. First, glass fine particles heated and hydrolyzed through raw material gas (mainly composed of silicon tetrachloride) in an oxyhydrogen flame are deposited on the substrate 122, thereby forming a first fine particle layer serving as the lower cladding layer 124a. Subsequently, a composition of the raw material gas is changed (a $GeO_2$ dopant concentration is changed), and thus glass fine particles having different compositions are deposited on the first fine particle layer, thereby forming a second fine particle layer serving as the core forming layer 301. Thereafter, for example, the first fine particle layer and the second fine particle layer are heated using an electrical furnace or the like, so that the respective layers are formed as transparent glass composition films, thereby forming the lower cladding layer 124a and the core forming layer 301. These layers can also be formed using a chemical vapor deposition method.

Figure 7C:
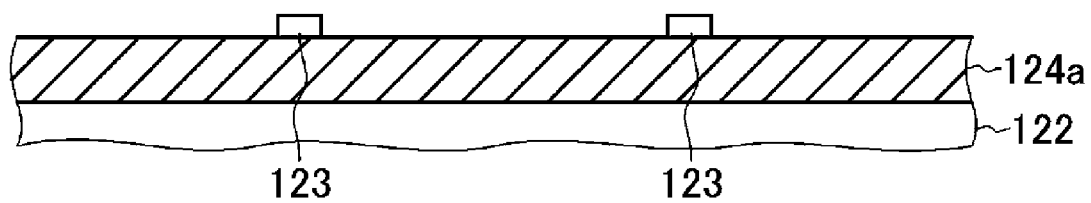
FIG. 7C is a cross-sectional view for explaining the method for producing the child optical waveguide chip that forms the wavelength checker according to the second embodiment of the present invention.

Then, the core forming layer 301 is patterned using a known lithography technique and etching technique used for manufacture of a semiconductor device, thereby forming the core 123, as illustrated in FIG. 7C. For example, a resist pattern is formed on the core forming layer 301 on a portion serving as the core 123 using the photolithography technique. Next, the core forming layer 301 is etched by reactive ion etching (RIE) using the formed resist pattern as a mask, and the portion serving as the core 123 is left with the other portions of the core forming layer removed. Thereafter, when the resist pattern is removed, the core 123 can be formed.

Figure 7D:
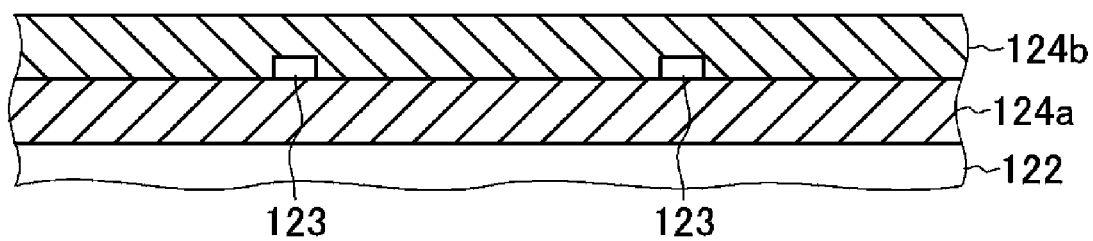
FIG. 7D is a cross-sectional view for explaining the method for producing the child optical waveguide chip that forms the wavelength checker according to the second embodiment of the present invention.

Next, an upper cladding layer 124b, is formed on the core 123, as illustrated in FIG. 7D. The upper cladding layer 124b, can be formed using the FHD method, similarly to the lower cladding layer 124a described above.

Figure 7E:
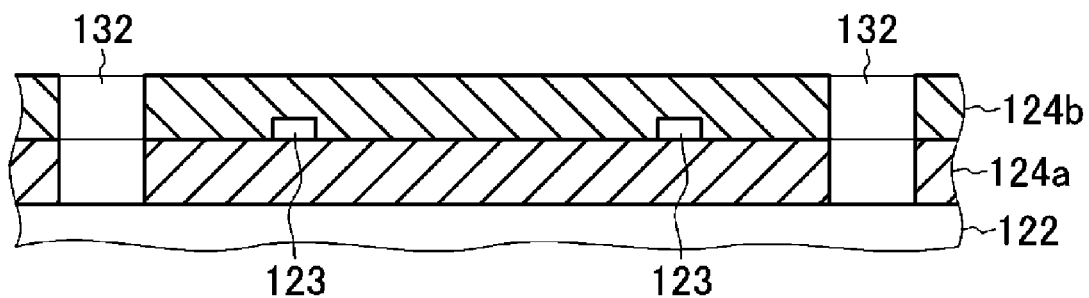
FIG. 7E is a cross-sectional view for explaining the method for producing the child optical waveguide chip that forms the wavelength checker according to the second embodiment of the present invention.

Then, the upper cladding layer 124b and the lower cladding layer 124a are patterned using a known lithography technique and etching technique, so that the second groove 132 penetrating the upper cladding layer 124b and the lower cladding layer 124a and reaching the substrate 122 is formed as illustrated in FIG. 7E. For example, a resist pattern having an opening at the location where the second groove 132 is formed is formed on the upper cladding layer 124b, by the photolithography technique. Then, the upper cladding layer 124b and the lower cladding layer 124a are etched by RIE using the formed resist pattern as a mask to remove a portion serving as the second groove 132. Thereafter, when the resist pattern is removed, the second groove 132 can be formed.

Figure 8:
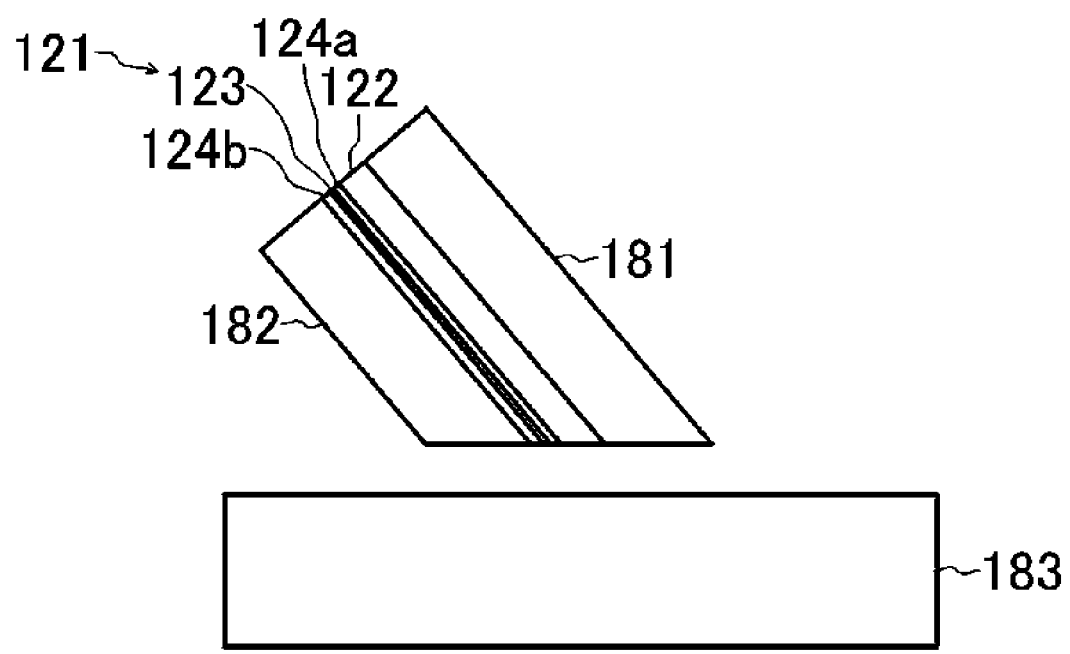
FIG. 8 is an explanatory diagram for explaining the method for producing the child optical waveguide chip that forms the wavelength checker according to the second embodiment of the present invention.

Next, formation of the light emitting-side end surface 108a of the child optical waveguide chip 121 will be described with reference to FIG. 8. First, a glass block 181 and a glass block 182 are attached and fixed on both sides of the child optical waveguide chip 121. For the attachment, for example, wax or the like can be used. Next, abrasive particles (not illustrated) are applied on an abrasive board 183, and the glass block 181 and the glass block 182 are fixed to a jig (not illustrated), and end surfaces of the glass block 181 and the glass block 182 are polished to form the light emitting-side end surface 108a. Thereafter, the wax is dissolved in an organic solvent, and the glass block 181 and the glass block 182 are separated from the child optical waveguide chip 121. These steps form the light emitting-side end surface 108a, which has become a mirror plane, on the child optical waveguide chip 121.

Figure 9A:
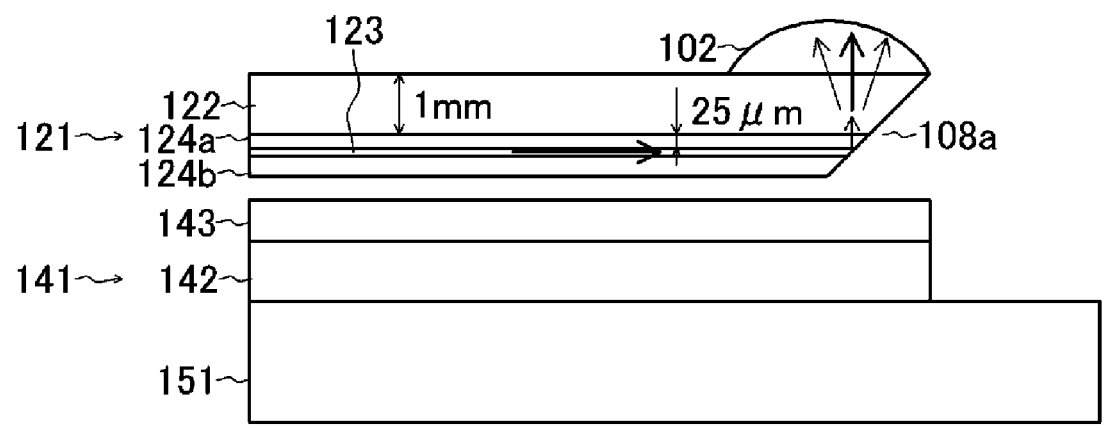
FIG. 9A is a cross-sectional view illustrating a configuration of the vicinity of an optical conversion unit 102 of the wavelength checker according to the second embodiment of the present invention.

FIG. 9A illustrates a magnified cross-section of a region of the light emitting-side end surface 108a of the child optical waveguide chip 121. For example, it is assumed that light is guided in an optical waveguide at a mode field diameter (MFD) of 6 µm (equivalent to spot size of 3 µm). This mode field diameter roughly corresponds to a mode field diameter achieved by an optical waveguide with a cross-sectional dimension of the core of 4.5 µm×4.5 µm (rectangular shape) and a specific refractive index difference of 1.5% between the core and the clad. Note that the spot size is half of the MFD.

A beam obtained by reflecting light having the MFD of 6 µm on the light emitting-side end surface 108a spreads out by diffraction. Hereinafter, an electric field distribution in the optical waveguide is approximated as a Gaussian distribution to calculate the above-described spread of the beam that propagates in the substrate 122 made of Si. When it is assumed that the spot size at the light emitting-side end surface 108a is $\omega_0$, a diameter of the beam that has propagated by a distance z from the light emitting-side end surface 108a is represented by Equation (6). This is described in detail in Reference 7. In Equation (6), $\lambda$ represents a wavelength. Equation (6) may be approximated by Expression (7), under the condition that the squared term in $\sqrt{}$ of Equation (6) is sufficiently larger than 1 (in this case, about z>100 µm).

Math 5

$$\omega(z) = \omega_0 \sqrt{1 + \left(\frac{\lambda z}{n\pi\omega_0^2}\right)^2} \quad (6)$$

$$\omega(z) \cong \omega_0 \left(\frac{\lambda z}{n\pi\omega_0^2}\right) \quad (7)$$

Figure 9B:
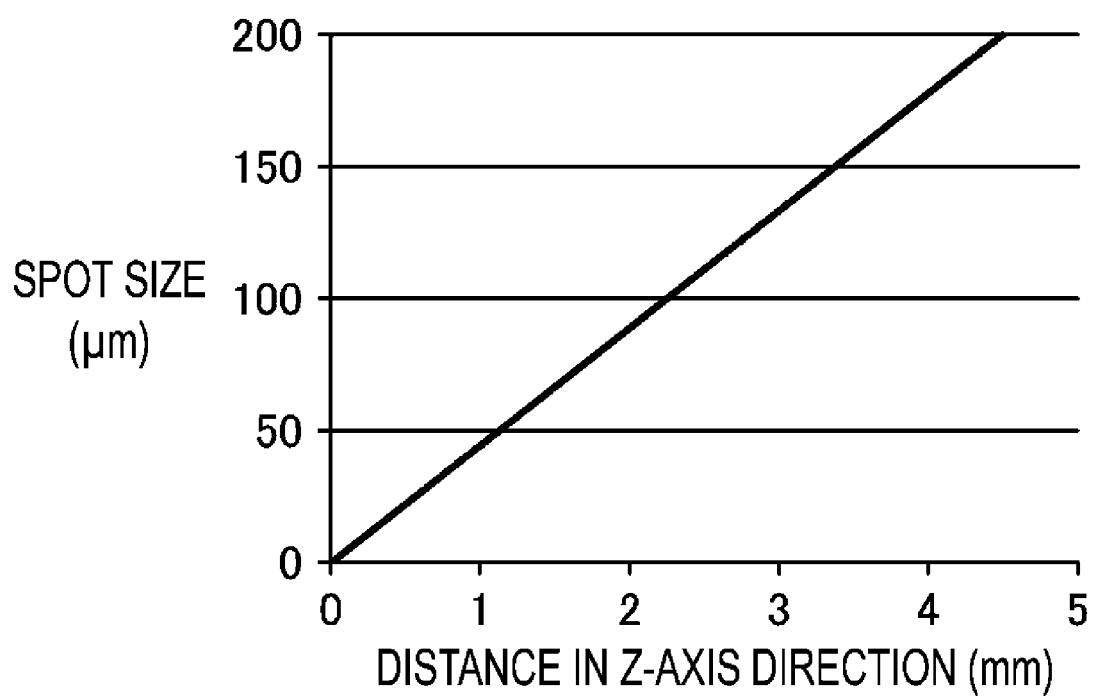
FIG. 9B is a characteristic diagram in which Expression (7) is plotted.

A plot of Expression (7) is shown in FIG. 9B. It can be seen that a region from a point where z is about 1 mm is to be considered and an accurate value is obtained there. The refractive index n of Si is 3.5. From FIG. 9B, when the beam propagates by a distance of approximately 1 to 2 mm, the spot size becomes 50 to 100 µm, and the mode field diameter (MFD) is 100 to 200 µm which is waveguide pitch (1 mm) or less, whereby the beam can be discriminated. The MFD is a distance twice as large as the spot size. The reason why the distance to propagate is 1 to 2 mm will be described next.

As illustrated in FIG. 9A, light that has propagated in an optical waveguide including the lower cladding layer 124a, the core 123, and the upper cladding layer 124b of the child optical waveguide chip 121 while being trapped in the core 123 is reflected on the light emitting-side end surface 108a, transmitted through the substrate 122, and incident on the optical conversion unit 102 to be converted to visible light. In general, the thickness of the substrate 122 is approximately 1 mm, and the thickness of the lower cladding layer 124a is approximately 25 µm. Accordingly, the propagation distance from being reflected on the light emitting-side end surface 108*a* to reaching the optical conversion unit 102 is 1 to 2 mm.

Incidentally, the light emitting-side end surface 108*a* has been described as a flat surface, but the present invention is not limited thereto, and may be a reflection surface (concave mirror) including a curved surface as in Reference 8. Note that when the curved surface (concave surface) is used, the light emitting-side end surface 108*a* cannot be made by the aforementioned polishing. For example, anisotropic etching is repeated to gradually change an angle of an end surface of a glass portion, and finally smoothing is performed by wet etching, so that a curved surface can be made. Note that in this case, the substrate 122 made of Si is not etched, and a portion to be etched is a portion of the lower cladding layer 124*a*, the core 123, and the upper cladding layer 124*b*, which are made of quartz-based glass.

As described above, when the light emitting-side end surface 108*a* is made a curved surface and a curvature radius of the curved surface and the like are properly designed, light reflected on the light emitting-side end surface 108*a* can be condensed at a point where the light reaches the optical conversion unit 102. When light is condensed in this manner, a power density of the light reaching the optical conversion unit 102 increases, and even if original signal light is weak, the light can be converted to visible light that can be recognized visually.

Figure 10:
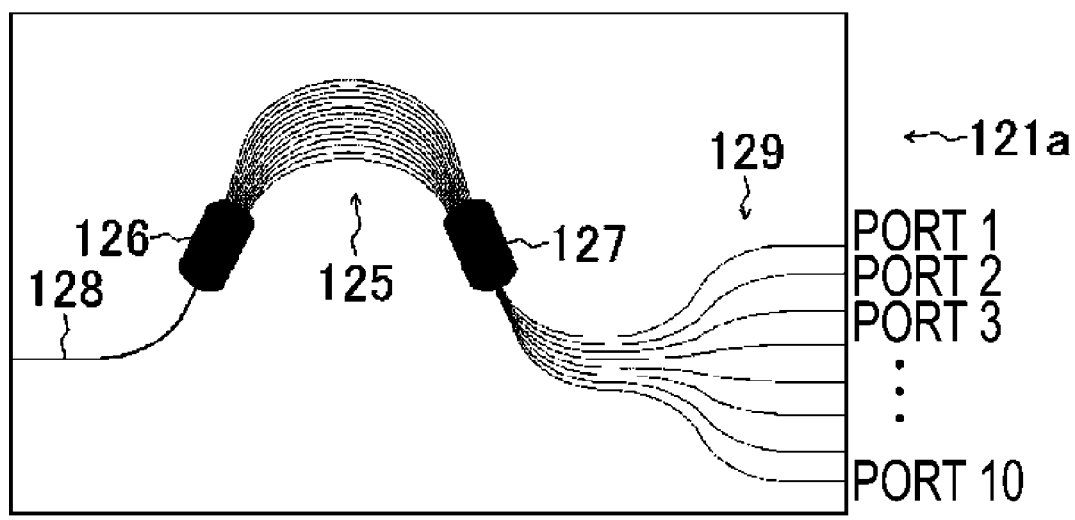
FIG. 10 is a plan view illustrating a partial configuration of another wavelength checker according to the second embodiment of the present invention.

Incidentally, as illustrated in FIG. 10, a child optical waveguide chip 121*a* provided with an arrayed waveguide grating may be used in place of the child optical waveguide chip 121. The child optical waveguide chip 121*a* includes an arrayed waveguide grating having a narrow demultiplexed wavelength interval. In FIG. 10, a reference sign 125 denotes a second arrayed waveguide, a reference sign 126 denotes a second input-side slab waveguide, a reference sign 127 denotes a second output-side slab waveguide, a reference sign 128 denotes a second input waveguide, and a reference sign 129 denotes second output waveguides. This is a normal arrayed waveguide grating in which the second arrayed waveguide 125 is arc-shaped in a plan view. This is an arrayed waveguide grating having a demultiplexed wavelength of from 1550 nm to 1600 nm, a demultiplexed wavelength interval of 5 nm, and 10 ports. Note that, in FIG. 10, some of the second output waveguides 129 are omitted.

Figure 11:
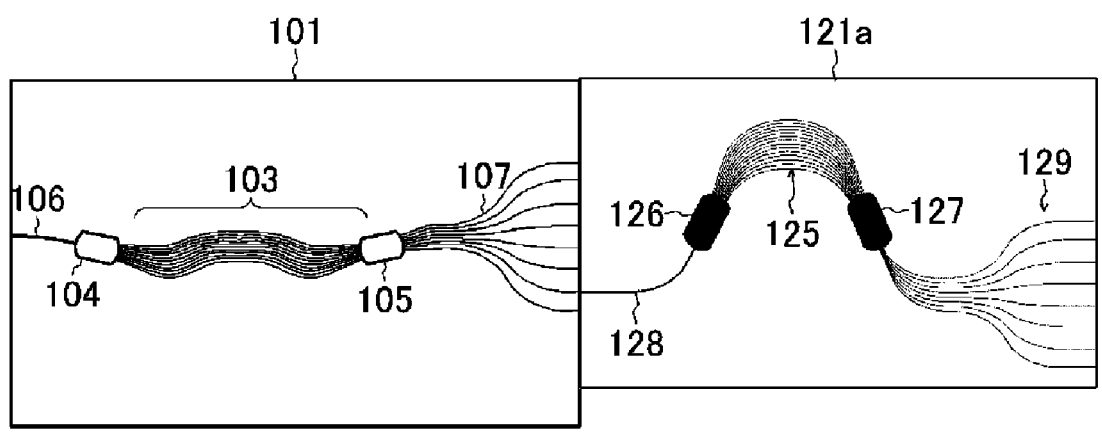
FIG. 11 is a plan view illustrating a partial configuration of the other wavelength checker according to the second embodiment of the present invention.
Figure 12:
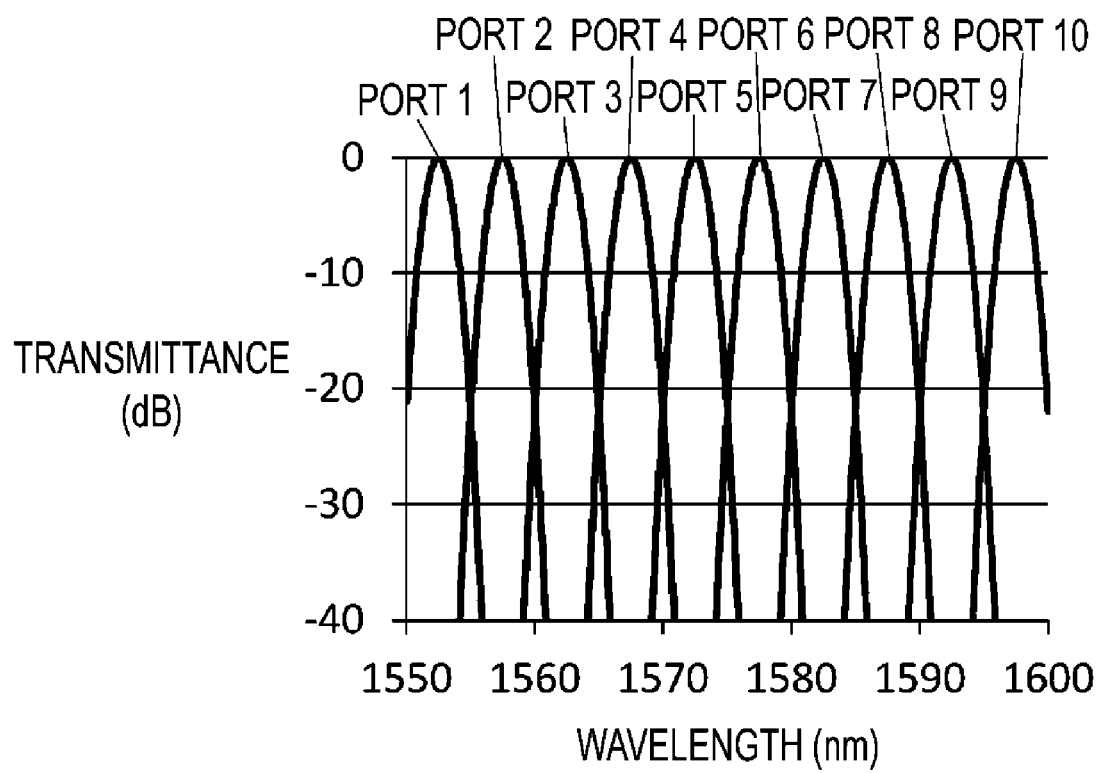
Figure 13:
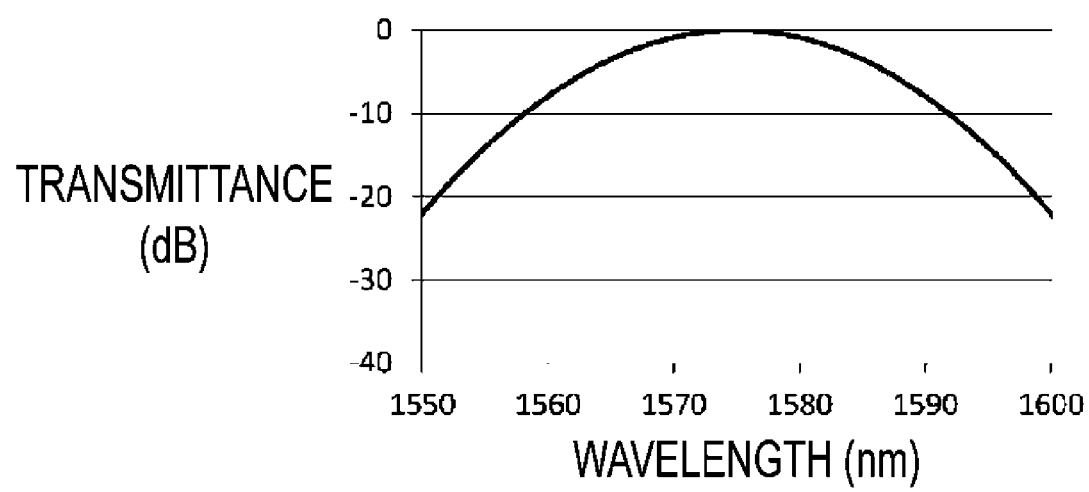
FIG. 13 is a characteristic diagram illustrating a result of calculation of a transmission spectrum of an arrayed waveguide grating of the child optical waveguide chip 101.
Figure 14:
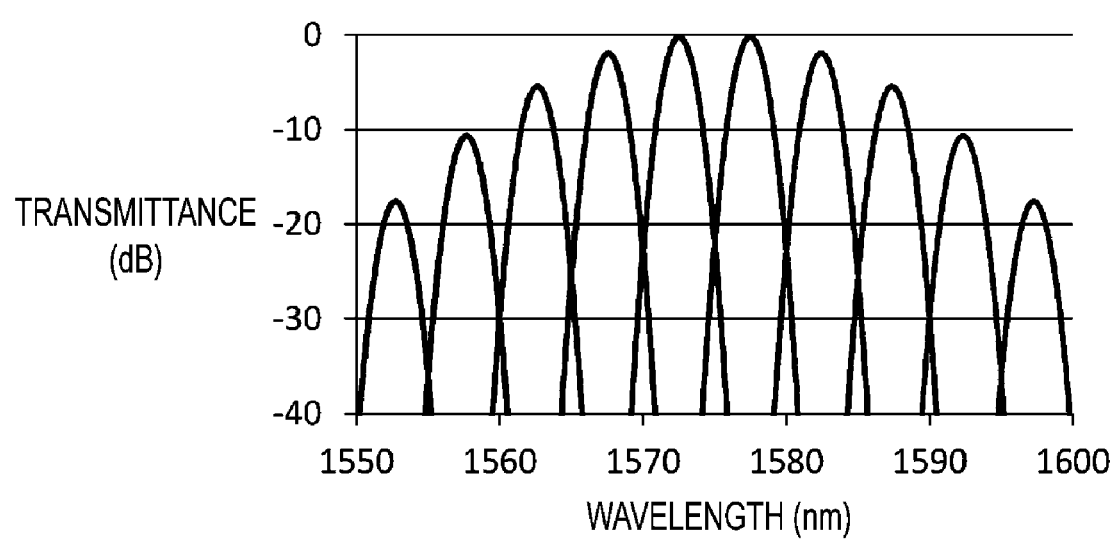
FIG. 14 is a characteristic diagram illustrating a spectrum obtained by synthesizing the spectrum illustrated in FIG. 12 and the spectrum illustrated in FIG. 13.

FIG. 11 illustrates a state of connection between the child optical waveguide chip 101 and the child optical waveguide chip 121*a*. As illustrated in FIG. 11, consider a case in which the second input waveguide 128 of the child optical waveguide chip 121*a* is optically connected to a port 7 of the first output waveguides 107 of the child optical waveguide chip 101. In this case, a transmission wavelength spectrum of the arrayed waveguide grating (having a narrow demultiplexed wavelength interval) of the child optical waveguide chip 121 is illustrated in FIG. 12. This spectrum is a result calculated using Expression (5). On the other hand, a transmission spectrum of the arrayed waveguide grating of the child optical waveguide chip 101 becomes a broad spectrum as illustrated in FIG. 13. The transmission spectrum in a configuration in which the child optical waveguide chip 101 and the child optical waveguide chip 121*a* are connected is a composite of the spectrum illustrated in FIG. 12 and the spectrum illustrated in FIG. 13, and thus becomes a spectrum as illustrated in FIG. 14.

The transmission spectrum in a case where the child optical waveguide chip 121 including linear optical waveguides is combined with the child optical waveguide chip 101 becomes a spectrum illustrated in FIG. 4, and has a wavelength resolution of 50 nm. In contrast, the transmission spectrum in a case where the child optical waveguide chip 121*a* including an arrayed waveguide grating is combined in the child optical waveguide chip 101 has a wavelength resolution of 5 nm, and it can be seen that wavelengths can be confirmed with higher definition.

In addition, in a configuration in which the child optical waveguide chip 121 is combined with the child optical waveguide chip 101, as illustrated in FIG. 4, the measurement range becomes a wideband of 400 nm ranging from 1250 nm to 1650 nm. In contrast, in a configuration in which the child optical waveguide chip 121*a* is combined with the child optical waveguide chip 101, the measurement range becomes a narrow band as illustrated in FIG. 14.

As described above, the child optical waveguide chip 121 and the child optical waveguide chip 121*a* are made interchangeable by PPCP implementation, so that the wavelength resolution and measurement range of the wavelength checker can be flexibly changed.

Note that while in the explanation described above, a wavelength is confirmed with higher definition by using an arrayed waveguide grating with a narrow wavelength interval in a wavelength range of wavelengths ranging from 1550 nm to 1600 nm, it can be seen that if an arrayed waveguide grating having 10 ports at 5 nm intervals is prepared and connected to a different output port of the arrayed waveguide grating of the child optical waveguide chip 101, the arrayed waveguide grating having 10 ports at 5 nm intervals corresponding to the range of wavelengths output from the different output port, a wavelength can be confirmed with a wavelength resolution of 5 nm even in other wavelength ranges.

Here, the description is added as to an arrayed waveguide grating having a narrow demultiplexed wavelength interval. An arrayed waveguide grating having a free spectral range (FSR) equal to channel spacing×the number of channels is referred to as a cyclic arrayed waveguide grating (circulating arrayed waveguide grating). When the above-described circulating arrayed waveguide grating is used for the arrayed waveguide grating with a narrow wavelength interval, an optical chip connected to the child optical waveguide chip 101 can be shared in the same circulating arrayed waveguide grating. However, in channels having excessively distant wavelengths such as a 1500 nm band and a 1300 nm band, a refractive index difference increases due to an effect of refractive index dispersion, and thus the arrayed waveguide grating cannot be shared.

In the above description, the device structure of the wavelength checker is explained, but here, the device structure will be supplemented slightly from the perspective of a wavelength inspection method. As a wavelength inspection method for an access-type PON system as well, an inspection method can be also proposed in which wavelengths are demultiplexed for each wavelength in an arrayed waveguide grating, and a material that converts near-infrared light to visible light (wavelength conversion material) is irradiated with demultiplexed light, and a wavelength is confirmed visually from a shiny port. Broad interpretation of the arrayed waveguide grating is a diffraction grating (grating), and thus an inspection method can be proposed in which wavelengths are demultiplexed for each wavelength in a diffraction grating (grating), a wavelength conversion material is irradiated with demultiplexed light, and a wavelength is confirmed visually from a shiny position. These inspection methods have a feature that wavelength inspection can be easily performed without using a power source or the like.

Third Embodiment

Figure 15:
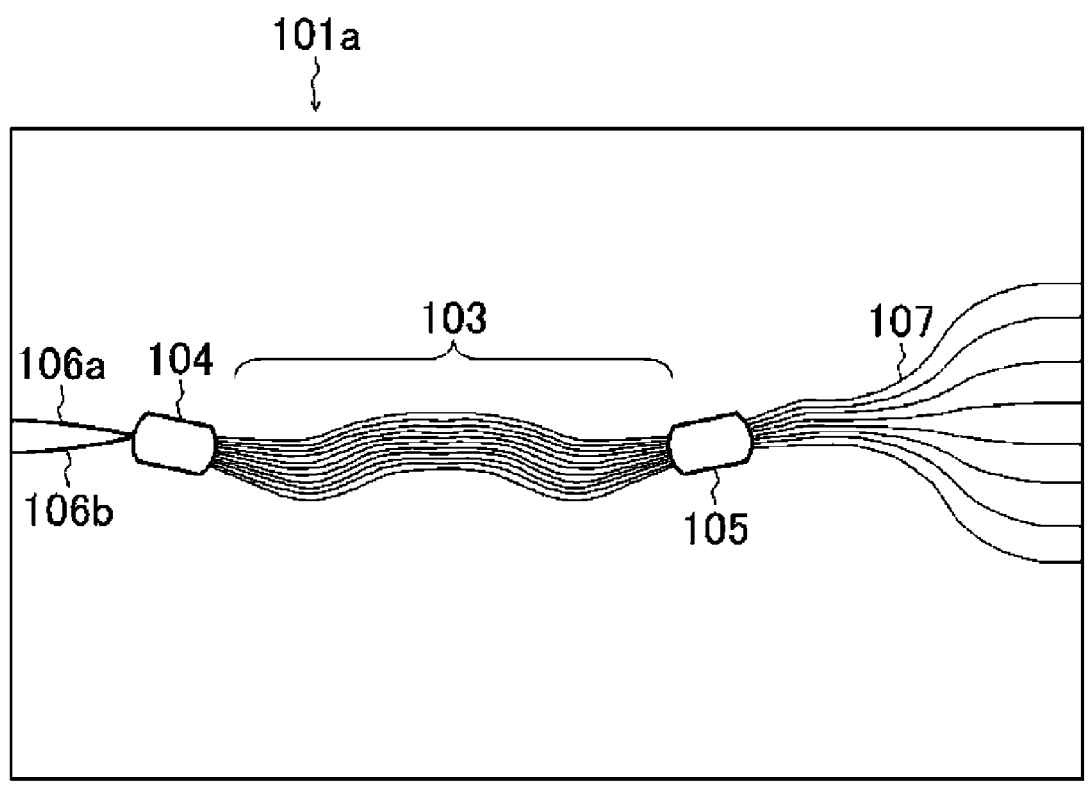
FIG. 15 is a plan view illustrating a partial configuration of a wavelength checker according to a third embodiment of the present invention.

Next, a wavelength checker according to a third embodiment of the present invention will be described with reference to FIG. 15. In the third embodiment, in the wavelength checker described with reference to FIG. 5A, FIG. 5B, and FIG. 5C, instead of the child optical waveguide chip 101, a child optical waveguide chip 101a illustrated in FIG. 15 is used. In the child optical waveguide chip 101a, a main first input waveguide 106a and a sub first input waveguide 106b are connected to an input side of the first input-side slab waveguide 104. Other configurations are the same as the child optical waveguide chip 101.

Here, when a waveguide interval in a connection portion of the plurality of first output waveguides 107 with the first output-side slab waveguide 105 is $\Delta x_{out}$, a waveguide interval between a connection portion of the main first input waveguide 106a with the first input-side slab waveguide 104 and a connection portion of the sub first input waveguide 106b with the first input-side slab waveguide 104 is $\Delta x_{out}/2$. Further, in the child optical waveguide chip 101a, the first input-side slab waveguide 104, the first arrayed waveguide 103, and the first output-side slab waveguide 105 have a shape, in a plan view, line-symmetrical with respect to a straight line that passes through a midpoint of a line segment connecting a center of the first input-side slab waveguide 104 and a center of the first output-side slab waveguide 105 and perpendicular to the line segment. In the first input-side slab waveguide 104, an arc in contact with the input waveguide and an arc in contact with the arrayed waveguide have the same curvature. Thus, the center of the input-side slab waveguide is an intersection of straight lines diagonally connecting four points at which straight lines and arcs constituting an outer shape of the slab waveguide intersect with each other. The same applies to the first output-side slab waveguide 105.

Hereinafter, more details will be described.

Figure 16A:
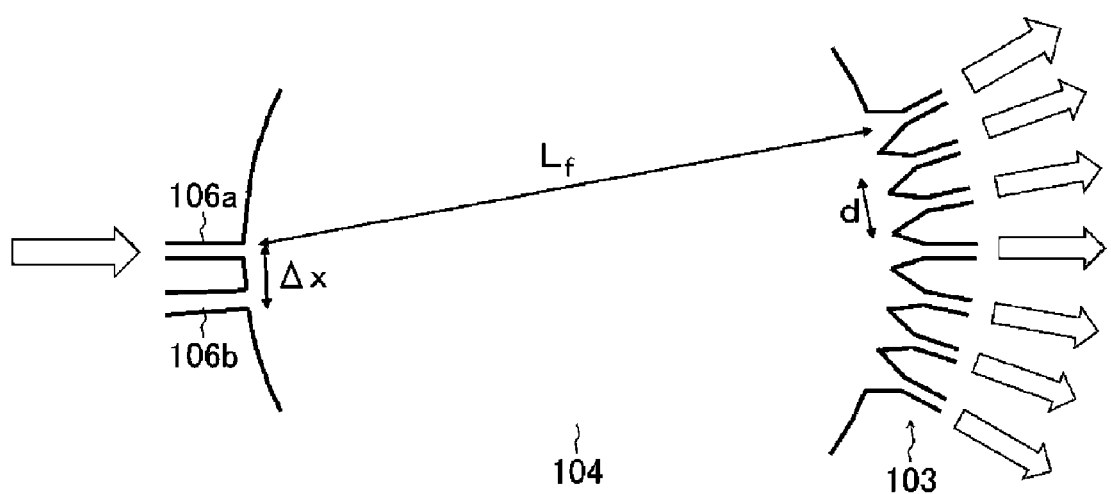
FIG. 16A is a plan view illustrating a partial configuration of the wavelength checker according to the third embodiment of the present invention.
Figure 16B:
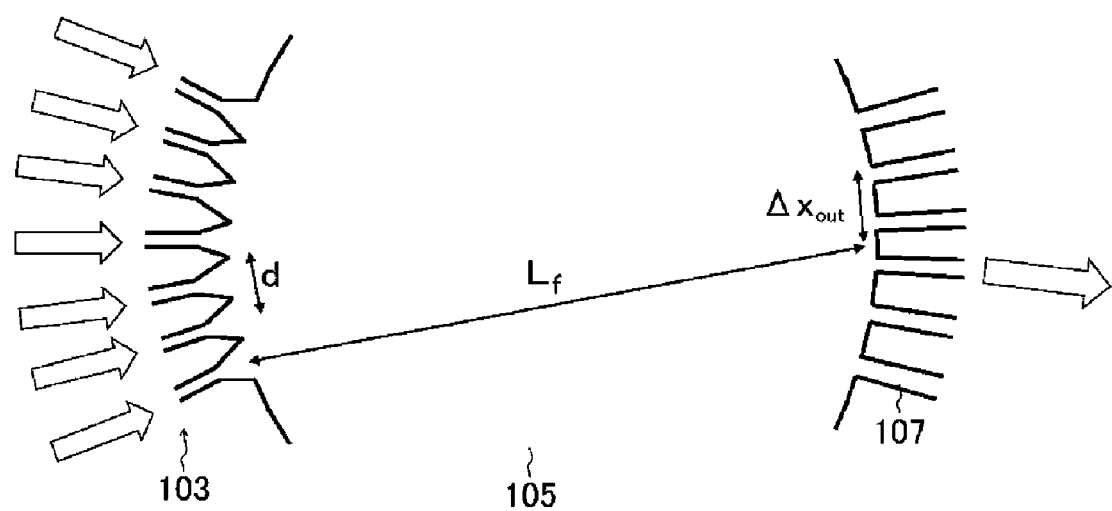
FIG. 16B is a plan view illustrating a partial configuration of the wavelength checker according to the third embodiment of the present invention.

The main first input waveguide 106a is connected to the center of the first input-side slab waveguide 104. Further, it is assumed that the respective first output waveguides 107 are connected to the center of the first output-side slab waveguide 105 at waveguide intervals of $\Delta x_{out}$, and that light is branched into light beams having equally spaced central transmission wavelengths of $\lambda 1, \lambda 2, \lambda 3, \ldots,$ and $\lambda 8$ with respect to the respective first output waveguides 107. Further, the sub first input waveguide 106b is connected to the first input-side slab waveguide 104 at a waveguide interval of $\Delta x$, which is equal to $\Delta x_{out}$, with respect to the main first input waveguide 106a (see FIG. 16A and FIG. 16B).

As described above, when the shape in a plan view of the first input-side slab waveguide 104, the first arrayed waveguide 103, and the first output-side slab waveguide 105 are line-symmetrical (see Reference 1), the following is satisfied.

When the sub first input waveguide 106b is connected, being shifted with respect to the main first input waveguide 106a, the wavelength-multiplexed light input to the sub first input waveguide 106b is branched into light beams having equally spaced central transmission wavelengths of $\lambda 2, \lambda 3, \lambda 4, \ldots,$ and $\lambda 9$ with respect to the respective first output waveguides 107. This is caused by the following reason: the sub first input waveguide 106b is shifted by one waveguide interval, and thus a wavefront when the light reaches the first arrayed waveguide 103 is inclined. As a result, a wavefront when the light reaches the first output waveguides 107 is inclined, and the light having the same wavelength is condensed on the first output waveguide 107 shifted by one waveguide interval. Note that in an arrayed waveguide (AWG), a connection position of a slab waveguide and an input waveguide and a central transmission wavelength are in a linear relationship. A detailed description is given in Reference 9.

When the waveguide interval $\Delta x$ between the main first input waveguide 106a and the sub first input waveguide 106b is $\Delta x_{out}/2$ and a central wavelength interval between adjacent channels is $\Delta\lambda$, the central transmission wavelengths become $\lambda 1+\Delta\lambda/2, \lambda 2+\Delta\lambda/2, \lambda 3+\Delta\lambda/2, \ldots,$ and $\lambda 8+\Delta\lambda/2$. The relationship of $\Delta\lambda=\lambda 2-\lambda 1=\lambda 3-\lambda 2=\ldots=\lambda 9-\lambda 8$ is satisfied.

Figure 17A:
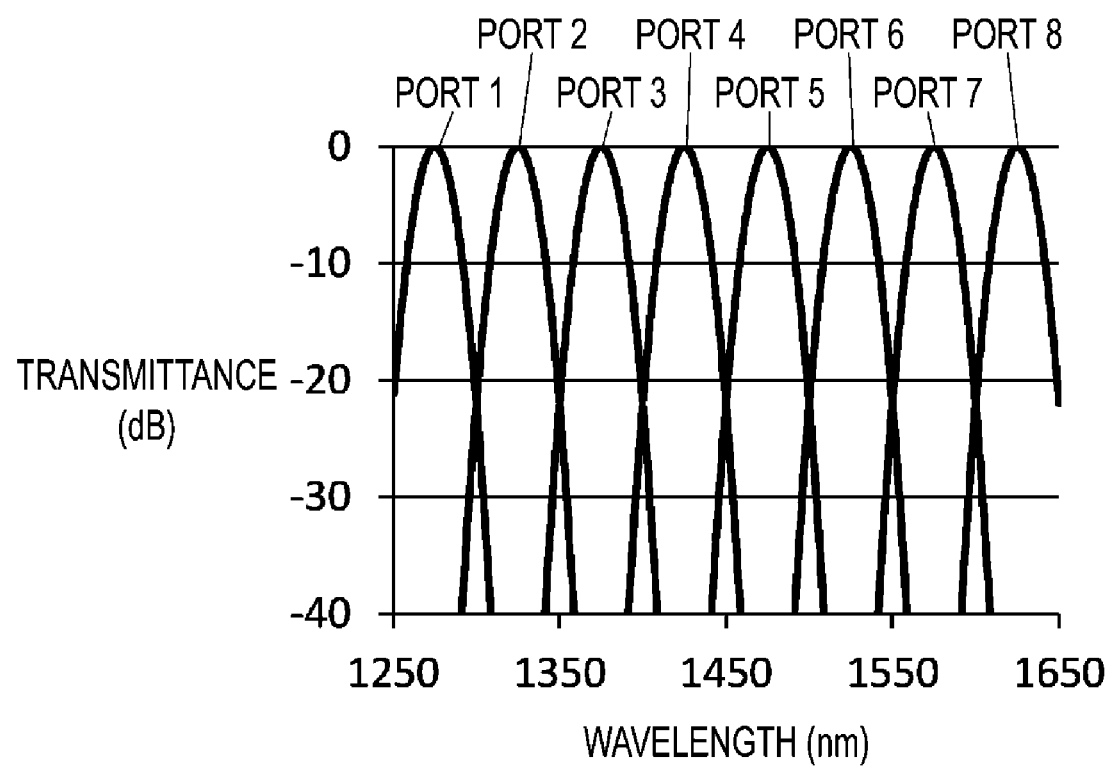
FIG. 17A is a characteristic diagram illustrating a result of calculation of a spectrum of light that is input from a main first input waveguide 106a of the child optical waveguide chip 101a and transmitted through an arrayed waveguide grating.

When the design of the arrayed waveguide grating in the child optical waveguide chip 101a is similar to that in the child optical waveguide chip 101, a spectrum (calculated value) of light input from the main first input waveguide 106a and transmitting through the arrayed waveguide grating becomes the same spectrum as the transmission spectrum of the child optical waveguide chip 101, as illustrated in FIG. 17A. That is, the central transmission wavelengths of the first output waveguides 107 are 1275 nm, 1325 nm, 1375 nm, 1425 nm, 1475 nm, 1525 nm, 1575 nm, and 1625 nm.

Figure 17B:
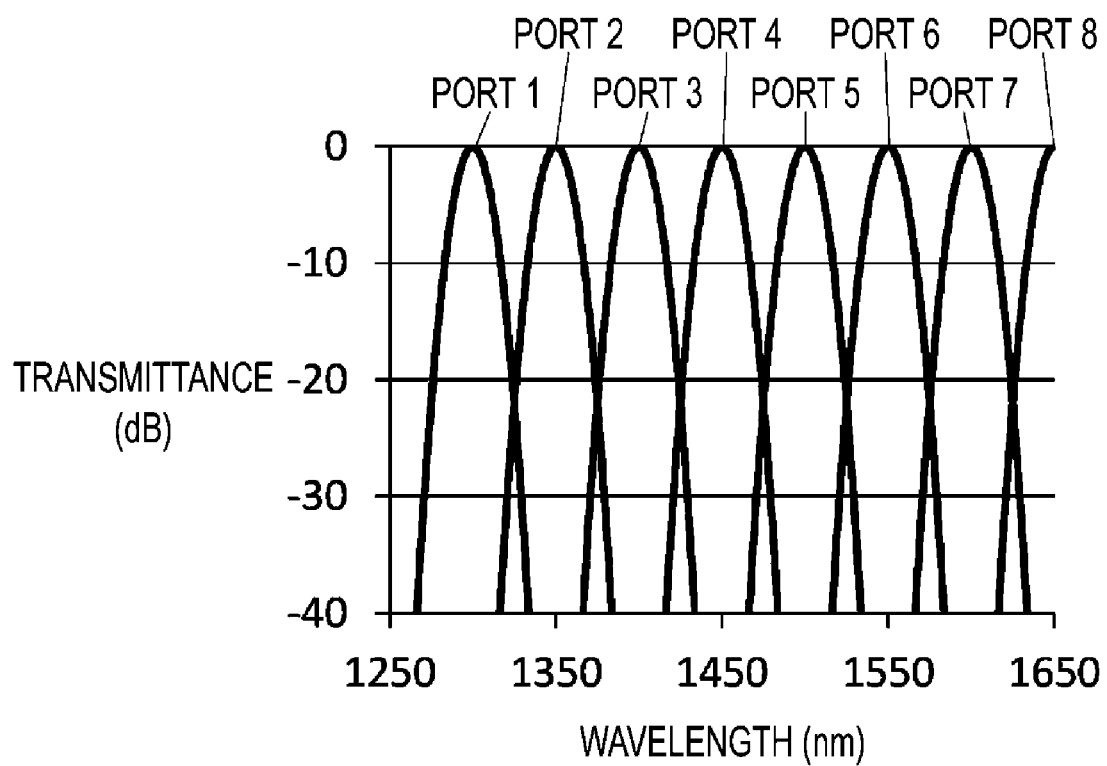
FIG. 17B is a characteristic diagram illustrating a result of calculation of a spectrum of light that is input from a sub first input waveguide 106b of the child optical waveguide chip 101a and transmitted through the arrayed waveguide grating.

On the other hand, a spectrum (calculated value) of light input from the sub first input waveguide 106b and transmitting through the arrayed waveguide grating is shifted by half the wavelength interval as illustrated in FIG. 17B, and becomes 1300 nm, 1350 nm, 1400 nm, 1450 nm, 1500 nm, 1550 nm, 1600 nm, and 1650 nm. That is, the transmission spectrum from the main first input waveguide 106a and the spectrum from the sub first input waveguide 106b are alternating with each other.

As compared with a case in which there is one input waveguide to the arrayed waveguide grating, effects of providing the main first input waveguide 106a and the sub first input waveguide 106b are as follows. When the number of input waveguides is one and light having a wavelength between transmission spectra of adjacent ones of the first output waveguides 107 is input, transmittance is low, and thus light converted from near-infrared light to visible light also becomes weak, so that the light emission in the optical conversion unit 102 cannot be recognized in some cases.

For example, the transmitted light intensities at ports 1 and 2 at a wavelength of 1300 nm in FIG. 17A deteriorate by 20 dB, as compared with the most transmissive wavelength (1275 nm or 1325 nm).

Figure 18:
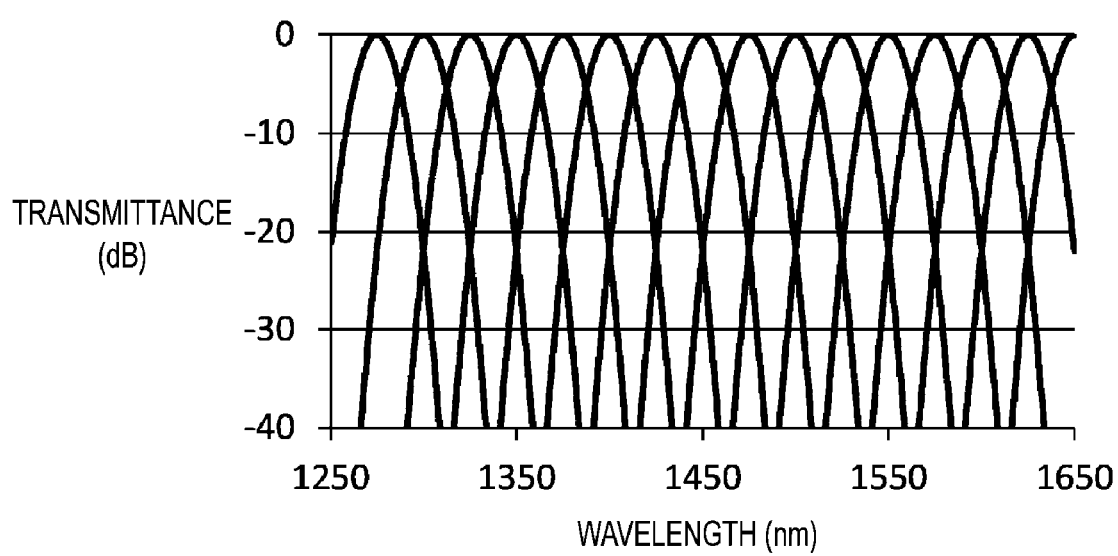
FIG. 18 is a characteristic diagram illustrating a spectrum obtained by synthesizing the spectrum illustrated in FIG. 17A and the spectrum illustrated in FIG. 17B.

On the other hand, when the main first input waveguide 106a and the sub first input waveguide 106b are used, signal light is also input to the sub first input waveguide 106b, so that the transmitted light intensity at port 1 at the wavelength of 1300 nm is the most transmissive wavelength. Consequently, as illustrated in FIG. 18 in which FIG. 17A and FIG. 17B are overlapped, it can be seen that use of the main first input waveguide 106a and the sub first input waveguide 100 yields deterioration of only 5 dB even at the least transmissive wavelength as compared with the most transmissive wavelength (excluding a wavelength of about 1250 nm).

Accordingly, even in a case in which signal light is input to one input waveguide, but transmitted light intensity with respect to the signal light is weak, and thus a wavelength cannot be recognized, the main first input waveguide 106a and the sub first input waveguide 100 are used and signal light is input to both the waveguides, so that stronger light emission can be obtained in the optical conversion unit 102, thereby enabling more reliable wavelength recognition.

Fourth Embodiment

Next, a wavelength checker according to a fourth embodiment of the present invention will be described with reference to FIG. 19. In the fourth embodiment, in the wavelength checker described with reference to FIG. 5A, FIG. 5B, and FIG. 5C, the child optical waveguide chip 101a illustrated in FIG. 15 is used instead of the child optical waveguide chip 101, and the child optical waveguide chip 121a provided with an arrayed waveguide grating having a narrow demultiplexed wavelength interval is used instead of the child optical waveguide chip 121 including linear optical waveguides. The arrayed waveguide grating of the child optical waveguide chip 121a is an arrayed waveguide grating having a demultiplexed wavelength of 1550 nm to 1600 nm, a demultiplexed wavelength interval of 5 nm, and 10 ports.

Figure 19:
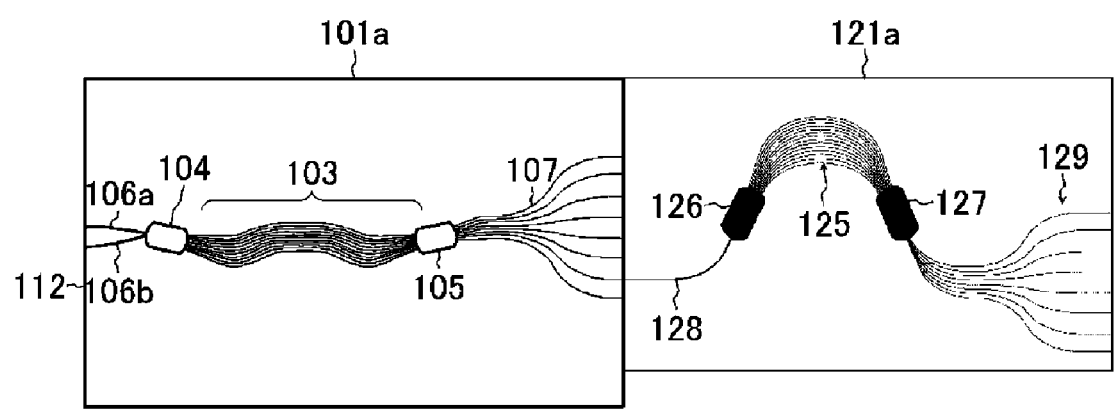
FIG. 19 is a plan view illustrating a partial configuration of a wavelength checker according to a fourth embodiment of the present invention.

First, as illustrated in FIG. 19, consider that light enters the arrayed waveguide grating of the child optical waveguide chip 101a from a main first input waveguide 106a, and consider a configuration in which a second input waveguide 128 of the child optical waveguide chip 121a is connected to a port 7 in the first output waveguides 107 of the child optical waveguide chip 101a. A transmission wavelength spectrum of the arrayed waveguide grating of the child optical waveguide chip 121a becomes a spectrum illustrated in FIG. 12, and a transmission spectrum of the child optical waveguide chip 101a plus the child optical waveguide chip 121a becomes a spectrum as illustrated in FIG. 20.

Figure 21:
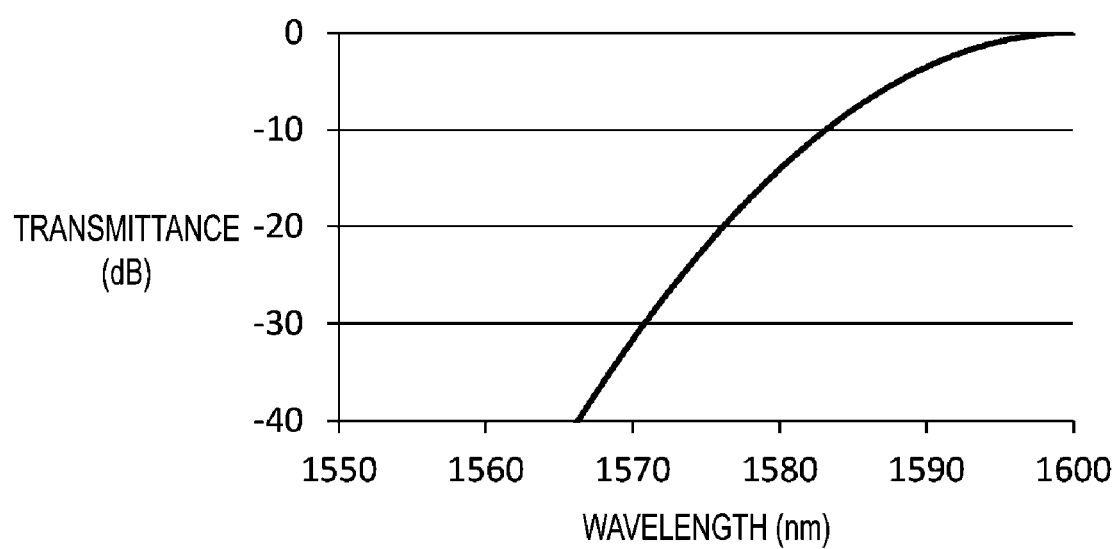
FIG. 21 is a characteristic diagram illustrating a result of calculation of a transmission spectrum of a port 7 of the child optical waveguide chip iota.

Next, considering that light is input to the arrayed waveguide grating of the child optical waveguide chip 101a from the sub first input waveguide 106b, a configuration is considered in which the second input waveguide 128 of the child optical waveguide chip 121a is connected to the port 7 of the first output waveguides 107 of the child optical waveguide chip 101a. A transmission spectrum of the port 7 of the child optical waveguide chip 101a becomes a spectrum as illustrated in FIG. 21. It can be seen that the spectrum illustrated in FIG. 21 is shifted by a half-wavelength interval (25 nm) to a longer wavelength side from the transmission spectrum (FIG. 13) in the case where light is input from the main first input waveguide 106a. On the other hand, the transmission spectrum of the child optical waveguide chip 121a is illustrated in FIG. 12, and thus the spectrum of light that is transmitted through the child optical waveguide chip 101a and the child optical waveguide chip 121a is illustrated as in FIG. 22.

Figure 23:
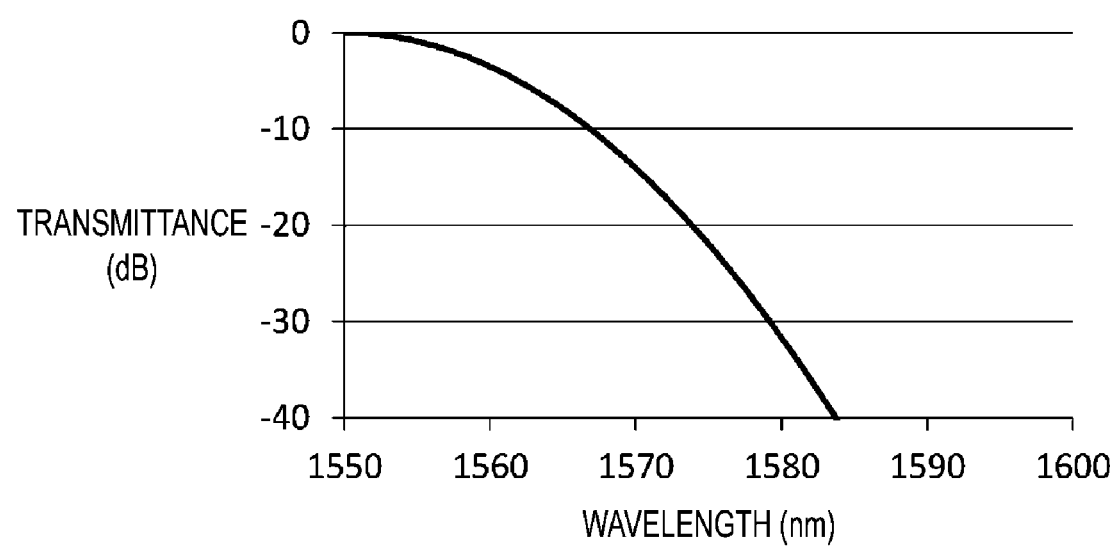

Next, consider that light is input to the arrayed waveguide grating of the child optical waveguide chip 101a from the sub first input waveguide 1o6b, and consider a configuration in which the second input waveguide 128 of the child optical waveguide chip 121a is connected to a port 6 in the first output waveguides 107 of the child optical waveguide chip 101a. A transmission spectrum of the port 6 of the child optical waveguide chip 101a is illustrated as in FIG. 23. The spectrum illustrated in FIG. 23 is shifted by the wavelength interval to a shorter wavelength side from the spectrum illustrated in FIG. 13. On the other hand, the transmission spectrum of the child optical waveguide chip 121a is illustrated in FIG. 12, and thus the spectrum of light that is transmitted through the child optical waveguide chip 101a and the child optical waveguide chip 121a is illustrated as in FIG. 24.

Figure 20:
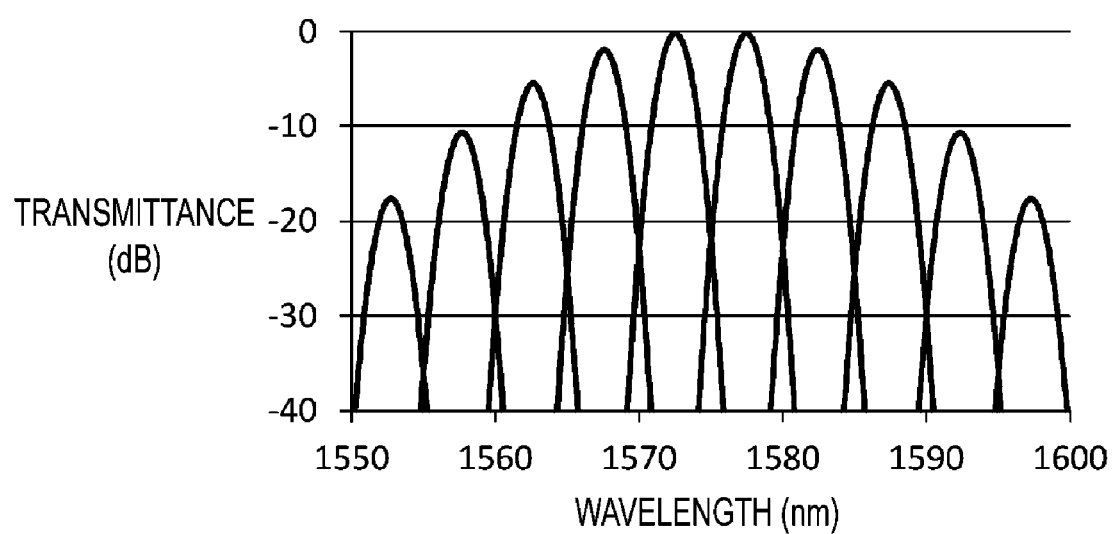
Figure 22:
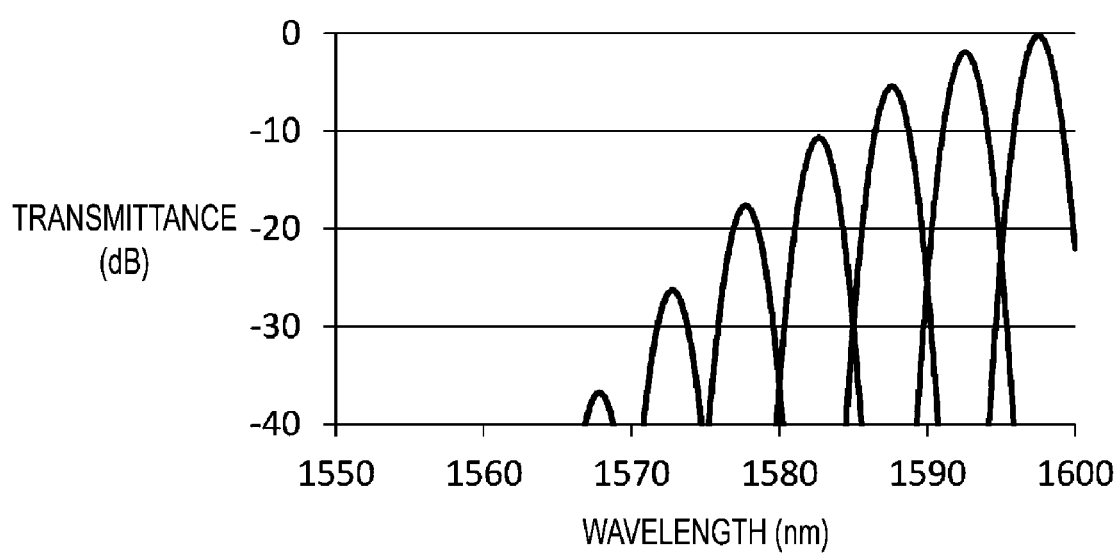
Figure 24:
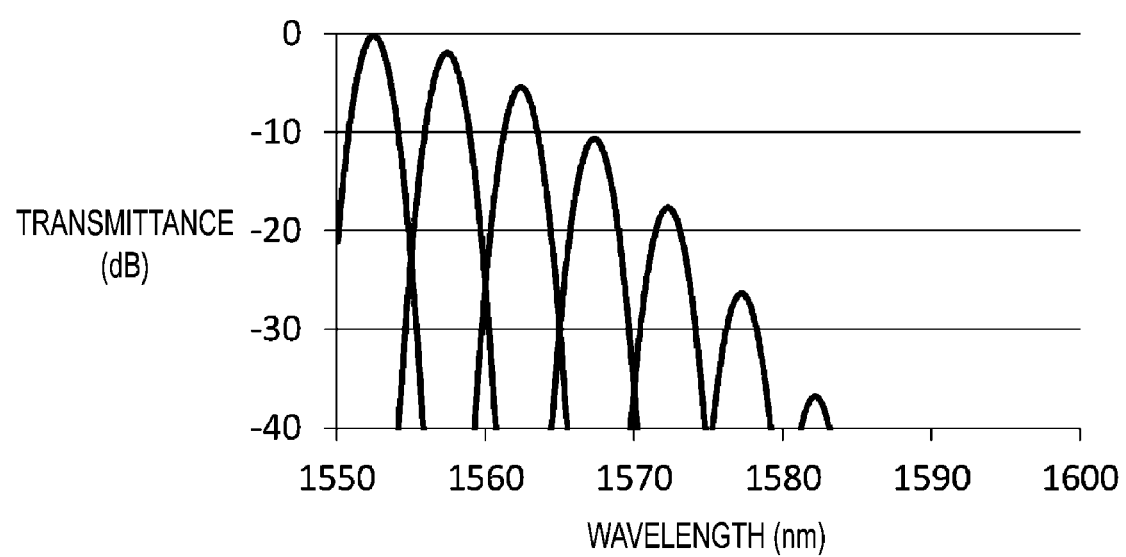
Figure 25:
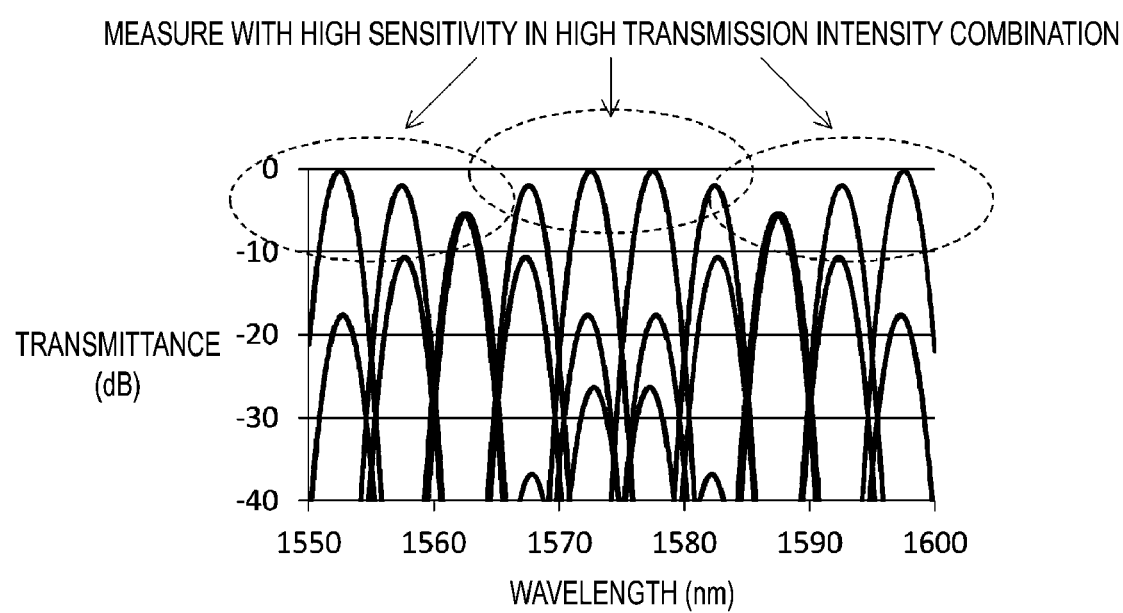
FIG. 25 is a characteristic diagram illustrating a spectrum obtained by synthesizing the spectrum of FIG. 20, the spectrum of FIG. 22, and the spectrum of FIG. 24.

As described above, the transmission spectrum using the main first input waveguide 106a and the sub first input waveguide 106b of the child optical waveguide chip 101a becomes a spectrum illustrated in FIG. 25 obtained by synthesizing the spectrum of FIG. 20, the spectrum of FIG. 22, and the spectrum of FIG. 24.

The transmission spectrum of the child optical waveguide chip 101 plus the child optical waveguide chip ma becomes a spectrum illustrated in FIG. 14, which shows a high transmittance at a wavelength of 1570 nm to 1580 nm but a low transmittance in the vicinity of 1550 and 1600 nm, whereby signal light may not be recognized. In contrast, in the case of the child optical waveguide chip 101a plus the child optical waveguide chip 121a, the synthesized transmission spectrum becomes a spectrum as illustrated in FIG. 25, which has a high transmittance even in the vicinity of 1550 nm and 1600 nm, whereby it is possible to widen a wavelength range in which signal light can be recognized.

Note that, in the above description, the child optical waveguide chip 101a provided with two waveguides, that is, the main first input waveguide 106a and the sub first input waveguide 106b, is used to widen the wavelength range in which a transmittance is high, but when two input waveguides are also provided in the arrayed waveguide grating of the child optical waveguide chip 101a, it is possible to further widen a wavelength range in which a transmittance is high.

Fifth Embodiment

Figure 26:
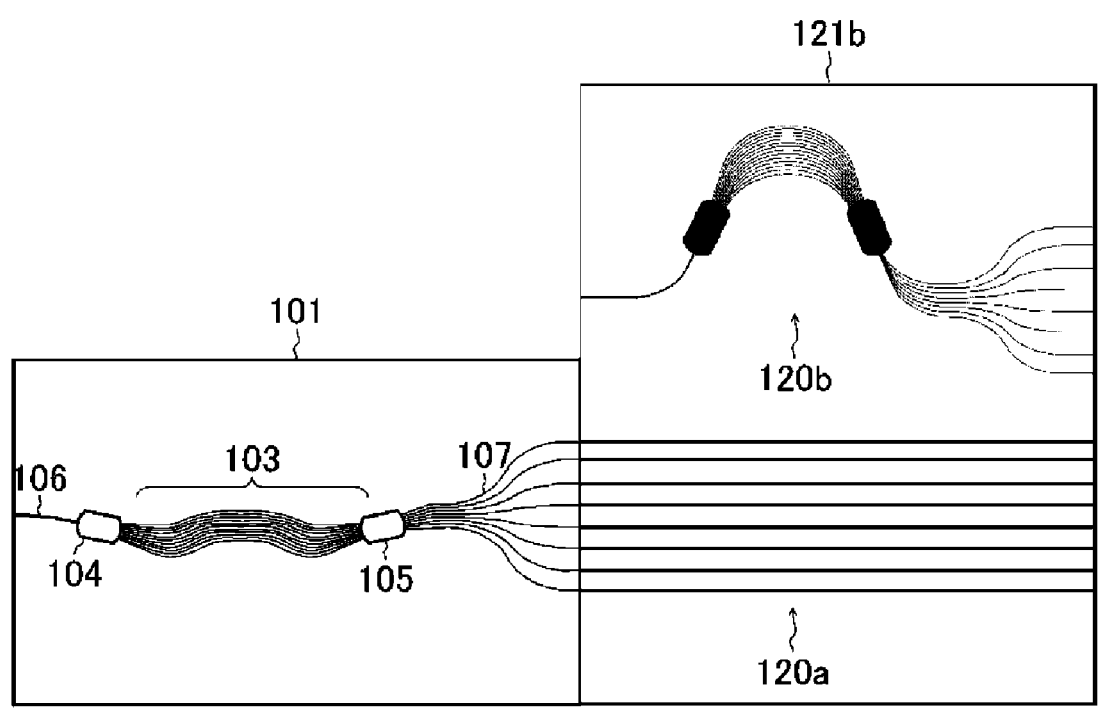
FIG. 26 is a plan view illustrating a partial configuration of a wavelength checker according to a fifth embodiment of the present invention.
Figure 27:
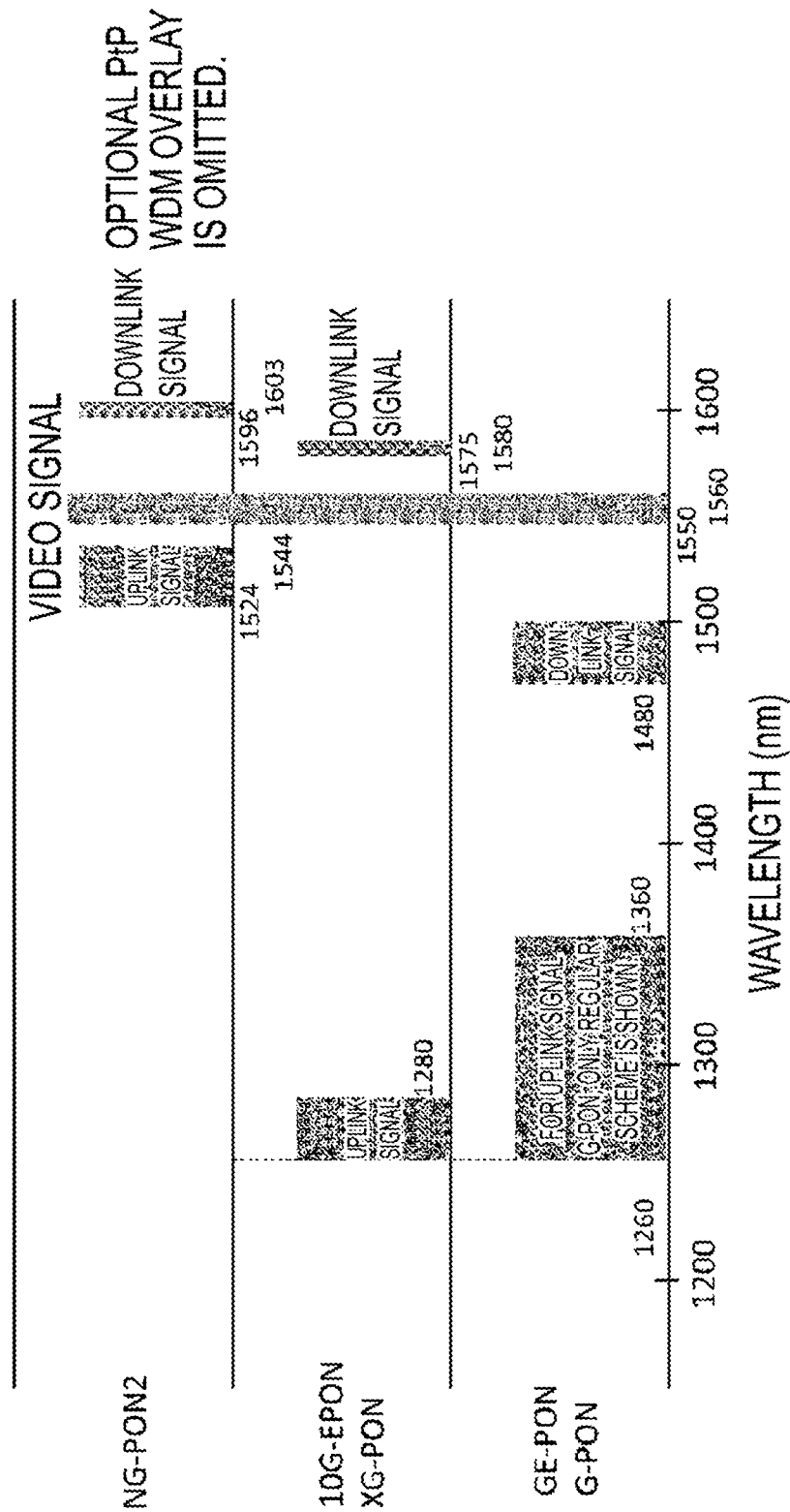
FIG. 27 is an explanatory diagram illustrating a relationship of wavelength allocation of NG-PON 2, 10G-EPON (XG-PON), and GE-PON (G-PON).

Next, a wavelength checker according to a fifth embodiment of the present invention will be described with reference to FIG. 26. As illustrated in FIG. 26, a child optical waveguide chip 121b provided with an optical waveguide portion 120a including linear optical waveguides and an arrayed waveguide grating 120b having a narrow demultiplexed wavelength interval is used instead of the child optical waveguide chip 121a of the wavelength checker described with reference FIG. 11.

An extra groove for fitting the child optical waveguide chip 121b is provided in a parent optical chip on which the child optical waveguide chip 101 and the child optical waveguide chip 121b are mounted to make the child optical waveguide chip 121b movable in a direction perpendicular to the light guided direction. With this configuration, the child optical waveguide chip 121b is slid over the parent optical chip to move the child optical waveguide chip 121b, so that connection between the child optical waveguide chip 101 and the optical waveguide portion 120a and connection between the child optical waveguide chip 101 and the arrayed waveguide grating 120b can be switched.

In the aforementioned implementation by PPCP, it is necessary to separately prepare the child optical waveguide chip 121 and the child optical waveguide chip 101a, but according to the fifth embodiment, only one child optical waveguide chip 121b need be provided, leading to the effect of reducing the number of parts. In general, for the arrayed waveguide grating of the child optical waveguide chip 121a, when a wavelength band is different, a separate arrayed waveguide grating needs to be prepared, but according to the fifth embodiment, for example, an arrayed waveguide grating required for a wavelength range in which an inspection resolution is to be increased only need be embedded in the child optical waveguide chip 121b to an extent permitted by the chip space.

As described above, the light emitting-side end surface of the optical waveguide chip on the side from which light is output to the external space is a reflection surface inclined so as to face the main substrate and the light emitting-side end surface is disposed in a location from which light reflected on the light emitting-side end surface is output to the external space, so that confirmation as to whether there is signal light in opening, failure isolation investigation, or the like of a PON system can be easily performed.

INDUSTRIAL APPLICABILITY

Meanwhile, the present invention is not limited to the embodiment described above, and it will be obvious to those skilled in the art that various modifications and combinations can be implemented within the technical idea of the present invention.

LIST OF REFERENCES

Reference 1: Hiroshi Takahashi et al., "Arrayed waveguide grating for WDM," NTT R&D, vol. 46, no. 7, pp. 685-692, 1997.
Reference 2: H. Takahashi et al., "Transmission Characteristics of Arrayed Waveguide N×N Wavelength Multiplexer," Journal of Lightwave Technology, vol. 13, no. 3, pp. 447-455, 1995.
Reference 3: JP 10-104446 A
Reference 4: JP 2017-32950 A
Reference 5: H. Ishikawa et al., "Pluggable Photonic Circuit Platform Using a Novel Passive Alignment Method," The Japan Society of Applied Physics, 22nd Microoptics Conference, D-6, pp. 84-85, 2017.
Reference 6: K. Shikama et al., "Pluggable photonic circuit platform for single-mode waveguide connections using novel passive alignment method," Japanese Journal of Applied Physics, vol. 57, 08PC03, 2018.
Reference 7: Kenji Kawano, "Base and application of optical coupling system for optical devices", Gendai Kogakusha, first edition, 1991.
Reference 8: JP 2014-35435 A
Reference 9: H. Takahashi et al., "Wavelength Multiplexer Based on $SiO_2$—$Ta_2O_5$ Arrayed-Waveguide Grating," IEEE Journal of Lightwave Technology, vol. 12, no. 6, pp. 989-005, 1994.

REFERENCE SIGNS LIST

101 Optical waveguide chip (child optical waveguide chip)
102 Optical conversion unit
103 First arrayed waveguide
103a Core portion
104 First input-side slab waveguide
104a Core portion
105 First output-side slab waveguide
106 First input waveguide
106a Main first input waveguide
106b Sub first input waveguide
107 First output waveguide
108 Light emitting-side end surface
111 Si substrate
112 Lower cladding layer
113 Upper cladding layer
120a Optical waveguide portion
120b Arrayed waveguide grating
121 Optical waveguide chip (child optical waveguide chip)
121a Child optical waveguide chip
121b Child optical waveguide chip
122 Substrate
123 Core
124 Cladding layer
124a Lower cladding layer
124b Upper cladding layer
125 Second arrayed waveguide
126 Second input-side slab waveguide
127 Second output-side slab waveguide
128 Second input waveguide
129 Second output waveguide
131 First groove
132 Second groove
141 Optical waveguide chip (parent optical waveguide chip)
142 Substrate
143 Cladding layer
151 Main substrate
161 Fiber block
162 Optical fiber
163 Connector
171 Spacer member
501 Arrayed waveguide
502 Input-side slab waveguide
503 Output-side slab waveguide
504 Input waveguide
505 Output waveguide.

The invention claimed is:

1. A wavelength checker comprising:
an optical waveguide chip; and
an optical converter comprising a conversion material configured to convert near-infrared light into visible light;
wherein the optical waveguide chip on a side connected to an optical fiber includes an arrayed waveguide grating and is mounted on a main substrate;
wherein a light emitting-side end surface of the optical waveguide chip on a side from which light is output to an external space is a reflection surface inclined to face the main substrate; and
the optical converter is provided at a location, on the optical waveguide chip, from which light reflected on the light emitting-side end surface is output to the external space.

2. The wavelength checker according to claim 1, wherein the conversion material is a phosphor or fluorescent substance.

3. The wavelength checker according to claim 1, wherein the optical converter is composed of a resin in which the conversion material is mixed.

4. The wavelength checker according to claim 1, further comprising a reflective film formed on the light emitting-side end surface.

5. The wavelength checker according to claim 1, wherein:
the optical waveguide chip is stacked in two layers;
the optical waveguide chip includes a substrate and a clad on the substrate;
when a side of the clad is defined as a surface of the optical waveguide chip, surfaces of upper and lower layers stacked of the optical waveguide chip face each other;
a plurality of child optical waveguide chips are provided on an upper surface of a parent optical waveguide chip;
a plurality of first grooves are formed in a clad portion of the parent optical waveguide chip, and a plurality of second grooves are formed in a clad portion of the plurality of child optical waveguide chips;

a plurality of spacer members are fitted in the plurality of first grooves in a form in which the plurality of spacer members partially protrude from the parent optical waveguide chip;

a protruding portion of any one of the plurality of spacer members is fitted in each of the plurality of second grooves of the child optical waveguide chip;

a first child optical waveguide chip of the plurality of child optical waveguide chips on a side connected to an optical fiber includes an arrayed waveguide grating, and a second child optical waveguide chip of the plurality of child optical waveguide chips includes a linear waveguide group or an arrayed waveguide grating; and the parent optical waveguide chip is fixed on the main substrate.

6. The wavelength checker according to claim 5, wherein the optical waveguide chip further comprises a core.

7. The wavelength checker according to claim 6, wherein the substrate of the optical waveguide chip is a Si substrate, and the core and the clad are composed of quartz-based glass.

8. The wavelength checker according to claim 5, wherein the plurality of spacer members includes an optical fiber.

9. The wavelength checker according to claim 5, wherein:

in the arrayed waveguide grating included in the first child optical waveguide chip, the arrayed waveguide grating includes an input waveguide, an input-side slab waveguide, a plurality of arrayed waveguides, an output-side slab waveguide, and a plurality of output waveguides;

the input-side slab waveguide, the plurality of arrayed waveguides, and the output-side slab waveguide are configured such that a shape in a plan view is line-symmetrical with respect to a straight line passing through a midpoint of a line segment connecting a center of the input-side slab waveguide to a center of the output-side slab waveguide, the straight line being perpendicular to the line segment;

the input waveguide includes a main input waveguide and a sub input waveguide; and when a connection interval in a plurality of portions where the plurality of output waveguides are connected to the output-side slab waveguide is $\Delta x_{out}$, a connection interval between portions where the main input waveguide is connected to the input-side slab waveguide and a portion where the sub input waveguide is connected to the input-side slab waveguide is $\Delta x_{out}/2$.

10. A method of forming a wavelength checker, the method comprising:

mounting an optical waveguide chip to a main substrate; and providing an optical converter at a location, on the optical waveguide chip, from which light is reflected on a light emitting-side end surface and is output to an external space, the optical converter comprising a conversion material configured to convert near-infrared light into visible light;

wherein the optical waveguide chip on a side connected to an optical fiber includes an arrayed waveguide grating; and wherein a light emitting-side end surface of the optical waveguide chip is a reflection surface inclined to face the main substrate.

11. The method of forming the wavelength checker according to claim 10, wherein the conversion material is a phosphor or fluorescent substance.

12. The method of forming the wavelength checker according to claim 10, wherein the optical converter is composed of a resin in which the conversion material is mixed.

13. The method of forming the wavelength checker according to claim 10, further comprising a reflective film formed on the light emitting-side end surface.

14. The method of forming the wavelength checker according to claim 10, wherein:

the optical waveguide chip is stacked in two layers;

the optical waveguide chip includes a substrate and a clad on the substrate;

when a side of the clad is defined as a surface of the optical waveguide chip, surfaces of upper and lower layers stacked of the optical waveguide chip face each other;

a plurality of child optical waveguide chips are provided on an upper surface of a parent optical waveguide chip;

a plurality of first grooves are formed in a clad portion of the parent optical waveguide chip, and a plurality of second grooves are formed in a clad portion of the plurality of child optical waveguide chips;

a plurality of spacer members are fitted in the plurality of first grooves in a form in which the plurality of spacer members partially protrude from the parent optical waveguide chip;

a protruding portion of any one of the plurality of spacer members is fitted in each of the plurality of second grooves of the child optical waveguide chip;

a first child optical waveguide chip of the plurality of child optical waveguide chips on a side connected to an optical fiber includes an arrayed waveguide grating, and a second child optical waveguide chip of the plurality of child waveguide chips includes a linear waveguide group or an arrayed waveguide grating; and the parent optical waveguide chip is fixed on the main substrate.

15. The method of forming the wavelength checker according to claim 14, wherein the optical waveguide chip further comprises a core.

16. The method of forming the wavelength checker according to claim 15, wherein the substrate of the optical waveguide chip is a Si substrate, and the core and the clad are composed of quartz-based glass.

17. The method of forming the wavelength checker according to claim 14, wherein the plurality of spacer members includes an optical fiber.

18. The method of forming the wavelength checker according to claim 14, wherein:

in the arrayed waveguide grating included in the first child optical waveguide chip, the arrayed waveguide grating includes an input waveguide, an input-side slab waveguide, a plurality of arrayed waveguides, an output-side slab waveguide, and a plurality of output waveguides;

the input-side slab waveguide, the plurality of arrayed waveguides, and the output-side slab waveguide are configured such that a shape in a plan view is line-symmetrical with respect to a straight line passing through a midpoint of a line segment connecting a center of the input-side slab waveguide to a center of the output-side slab waveguide, the straight line being perpendicular to the line segment;

the input waveguide includes a main input waveguide and a sub input waveguide; and when a connection interval in a plurality of portions where the plurality of output waveguides are connected to the output-side slab waveguide is Δxout, a connection interval between portions where the main input waveguide is connected to the input-side slab waveguide and a portion where the sub input waveguide is connected to the input-side slab waveguide is Δxout/2.

* * * * *